US005251190A

United States Patent [19]

Miyasaka et al.

[11] Patent Number: 5,251,190

[45] Date of Patent: Oct. 5, 1993

[54] ELECTRONIC TIMEPIECE HAVING FUNCTIONAL HANDS

[75] Inventors: Kenji Miyasaka; Noritoshi Suzuki; Shinichi Yamada; Kenji Shimoda; Nobuyuki Uehara, all of Tanashi, Japan

[73] Assignee: Citizen Watch Co., Ltd., Tokyo, Japan

[21] Appl. No.: 836,854

[22] Filed: Feb. 19, 1992

[30] Foreign Application Priority Data

| | | | |
|---|---|---|---|
| Feb. 22, 1991 | [JP] | Japan | 3-014510[U] |
| Aug. 30, 1991 | [JP] | Japan | 3-076764[U] |
| Sep. 4, 1991 | [JP] | Japan | 3-079477[U] |
| Sep. 15, 1991 | [JP] | Japan | 3-228472 |

[51] Int. Cl.[5] .................... G04B 47/06; G01L 7/00

[52] U.S. Cl. .................... 368/10; 368/80; 73/290 R

[58] Field of Search .................... 368/10, 11, 76, 80, 368/223; 73/290 R, 291, 384–387, 432.1, 437

[56] References Cited

U.S. PATENT DOCUMENTS

| | | | |
|---|---|---|---|
| 3,696,610 | 10/1972 | Charbonnier | 368/223 |
| 3,910,117 | 10/1975 | Wicklund | 73/291 |
| 3,992,949 | 11/1976 | Edmondson | 73/432 R |
| 4,197,747 | 4/1980 | Koehler | 73/431 |
| 4,466,285 | 8/1984 | Allemano | 73/432 R |
| 4,694,410 | 9/1987 | Murata | 364/558 |
| 4,783,772 | 11/1988 | Umemoto et al. | 368/11 |
| 4,999,606 | 3/1991 | Comerford | 340/525 |
| 5,031,160 | 7/1991 | Koizumi et al. | 368/10 |
| 5,113,381 | 5/1992 | Sakamoto et al. | 368/74 |

FOREIGN PATENT DOCUMENTS

| | | |
|---|---|---|
| 0388491 | 9/1990 | European Pat. Off. . |
| 7247160 | 4/1973 | Fed. Rep. of Germany . |
| 1565675 | 5/1969 | France . |
| 59-005989 | 4/1984 | Japan . |
| 59-102179 | 10/1984 | Japan . |
| 568608 | 4/1975 | Sweden . |

*Primary Examiner*—Vit W. Miska
*Attorney, Agent, or Firm*—Kanesaka and Takeuchi

[57] ABSTRACT

An electronic timepiece having functional hands includes indicating hands for indicating the time such as hours and minutes, a detection unit for detecting the information other than the time and an indicating part for indicating the information detected by the detection unit. The detection unit includes a first functional hand and a second functional hand for indicating mutually relevant information data.

12 Claims, 19 Drawing Sheets

ELECTRONIC TIMEPIECE HAVING FUNCTIONAL HANDS

BACKGROUND OF THE INVENTION

1. Field of the Invention

This invention relates to an electronic timepiece having functional hands and adapted for detecting information other than time by a sensor and indicating the information by indicating hands.

2. Related Art

A variety of electronic timepieces having the function of indicating the depth of water by a water pressure sensor as an additional function, are is presented to the market. These timepieces are adapted for digitally indicating the depth of water by electro-optical display units. Display parts are hardly visible in water where extraneous light is hard to reach and, in case of a liquid crystal display, display can hardly be read from a certain viewing angle.

On the other hand, water depth indication by an indicating hand according to the Bourdon tube system has such an advantage that the water depth can be read easily from the hand position. In JP patent KOKAI publication No. 61-34416, there is proposed a timepiece provided with an additional function of indicating the water depth by an indicating hand. However, the timepiece disclosed in JP patent KOKAI publication No. 61-34416 is provided with only one indicating hand for indicating the current diving water depth.

Meanwhile, when a diver operating in water is floating up, nitrogen or helium in the blood tends to be supersaturated due to reduction in an external pressure to produce dysbarism in which air bubbles are produced in the blood to injure body organs. The customary process in combatting the symptom is to compare the diving time duration to the maximum depth reached during diving to take suitable measures to prevent dysbarism. It is therefore desired by divers operating in water that the depth of water during diving and the maximum depth reached during diving are displayed.

From this viewpoint, an apparatus for measuring and processing the depth of water by a water pressure sensor and indicating the depth of water by the indicating hand by an electromechanical transducer needs to be provided with a water depth hand which, in synchronism with the divers movement in water, is turned in a forward direction during deep diving for indicating a deep depth of water and in a reverse direction during floating for indicating a shallow depth of water, and with a maximum water depth hand adapted for indicating the maximum depth reached and adapted for being turned only in case of deep diving.

On the other hand, if the water depth indication is made by an indicating hand, an electronic timepiece structure is such that a space occupied by a display mechanism is increased as compared with digital display while, the time for driving the train wheels for display is also increased. The JP patent KOKAI publication No. 59-159083 and the Switzerland patent 568608 disclose a wrist watch having a water depth meter and an indicating hand.

However, in these publications, only the schematics of the timepiece, the sensor mounting position and specifications are explained, where as the inner structure of the timepiece movement is not explained in detail.

Thus the problem of reducing the size and the thickness of the timepiece movement by efficiently arranging the motors and the train wheels and providing a water depth measurement system with good follow-up for displaying the current diving depth, has not yet been overcome.

SUMMARY OF THE INVENTION

Object of the Invention

It is an object of the present invention to provide an electronic timepiece provided with functional hands wherein not only the time but also the information other than time, such as the current depth of water and the maximum reached depth of water in case of indicating the depth of water, may be indicated simultaneously by indicating hands.

It is another object of the present invention to provide an electronic timepiece provided with functional hands, wherein the two functional hands other than time indicating hands are driven by separate driving units and wherein the counter wheels of two train wheels from the driving units to the functional hands are used in common to reduce the types of counter wheels as well as to prevent mistakes which might occur during assembling of the train wheels.

It is a further object of the present invention to provide an electronic timepiece provided with functional hands, wherein the water depth measurement system, motors of the functional units and the train wheels are arrayed efficiently to reduce the size and the thickness of the timepiece movement.

It is a further object of the present invention to provide an electronic timepiece provided with functional hands, wherein a coil of the timepiece mechanism is arrayed at right angles to the lower portion of the circuit board on a line of elongation of the winding stem, and wherein an IC chip is provided in proximity to the coil for increasing the space on the circuit board around the IC chip for facilitating pattern inter connections.

It is a further object of the present invention to provide an electronic timepiece provided with functional hands, wherein the current diving depth and the maximum reached depth may be indicated quickly with good follow-up of the indicating hands.

It is yet another object of the present invention to provide an electronic timepiece provided with functional hands wherein inspection of the rotation of the train wheels may be made during the movement assembling process.

Feature of the Invention

In accordance with the present invention, there is provided an electronic timepiece having functional hands and adapted for indicating at least the time such as hours and minutes by indicating hands, comprising detection means for detecting the information other than time, and display means for displaying the information detected by said detection means, said display means including an indicating part having a first functional hand and a second indicating part having a second functional hand.

The electronic time piece having functional hands according to the present invention is characterized in that the functional hands are moved responsive to measured water depths during diving to effect water depth display, in that the fast feed rate of the motor f the functional unit and the speed reduction ratio of the train wheels are set to optimum values to prevent mistaken operations of the functional hands due to impacts or the like, and in that the motor of the functional unit and the train wheels are arranged for reducing the size and the thickness of the timepiece movement.

The electronic timepiece having the functional hands according to the present invention is also characterized by position-setting means for position-setting markers of said gears and said stationary plate, means for rotating said gears a predetermined amount and means for checking the positions of the markers after the end of the rotation.

DESCRIPTION OF THE PREFERRED EMBODIMENTS

A first embodiment, described hereinbelow, is an electronic wrist watch 1 fitted with functional hands or hands. The wrist watch includes a time indicating hands at a mid position and two indicating hands or hands for indicating the depth of water sensed by a water pressure sensor and the maximum depth of water.

Figure 1:
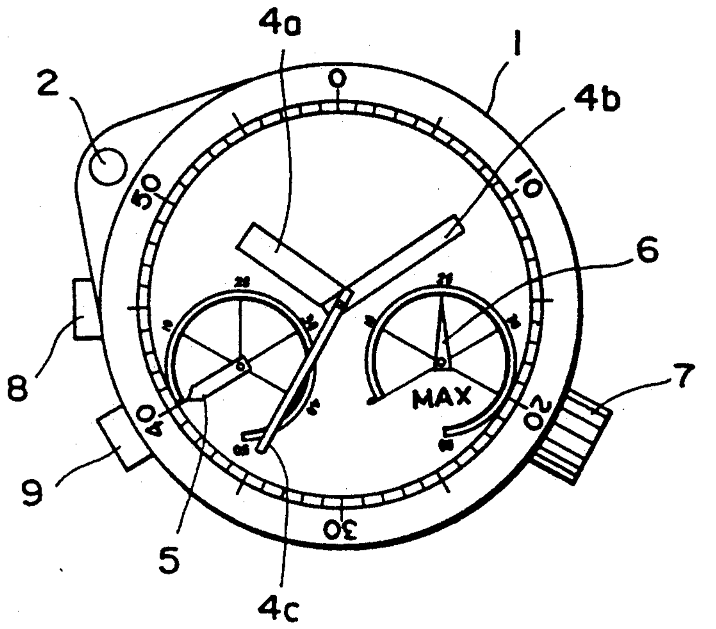
FIG. 1 is a front view showing a first embodiment of an electronic timepiece having functional hands, wherein the depth of water value and the maximum depth of water value are indicated by subsidiary hands.

The electronic wrist watch 1 shown in FIG. 1 has an hour hand **4*a*, a minute hand 4*b*, and a second hand 4*c* at the mid position, as well as a depth of water hand 5 indicating the depth of water based on the information from a water pressure sensor 2 at the eight o'clock position and a maximum depth of water hand 6 indicating the maximum depth of water during diving at the four o'clock position. A crown 7, pulled by one step, controls a switch block 23 as later described, and corrects time indication, in the manner of a usual watch, when rotated under the same state of the crown 7. Push-buttons 8, 9, when thrust, control the switch block 23**.

Figure 2:
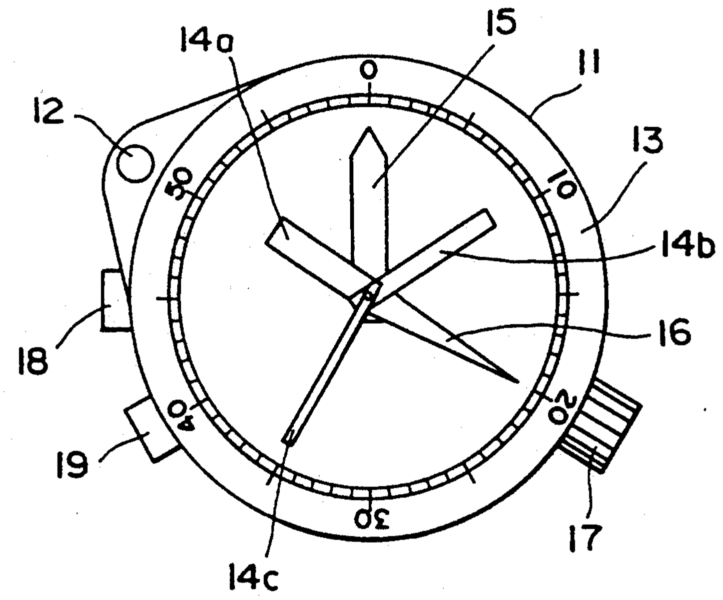
FIG. 2 is a front view showing the timepiece of FIG. 1 wherein the depth of water and the maximum depth of water are indicated by hands arranged on the same axis as the timepiece hands.

An electronic wrist watch, shown in FIG. 2, includes time indicating hands, similarly to FIG. 1, and two hands, coaxial with the time indicating hands, for indicating the depth of water as sensed by a water pressure sensor 12, and the maximum depth of water. That is, the wrist watch is an electronic wrist watch 11 having an hour hand **14*a*, a minute hand 14*b* and a second hand 14*c* at the mid position and, in addition, a depth of water hand 15 for indicating the depth of water based on the information from the sensor 12, a maximum depth of water hand 16 indicating the maximum depth of water reached during diving, these hands 15, 16 being similarly provided at the mid position as if they were also indicating the time. A graduated ring 13 is provided around the hours and hands so as to be used as minute graduations and depth of water graduations simultaneously. That is, the minute hand 14*b*. the depth of water hand 15 and the maximum depth of water hand 16, pointing to graduation "10", indicate the time of 10 minutes, the current diving depth of water of 10 m and the maximum depth of water reached during diving of 10 m, respectively. The hands and hands, radially pointing to the graduated ring 13**, may be of different colors and shapes to prevent misleading by the user.

The crown 17, pulled one step, controls the switch block 23 as later described and, when rotated at the same position, corrects time indication in the manner of an ordinary wrist watch. Pushbuttons 18, 19, when pushed, control switch block 23.

Figure 3:
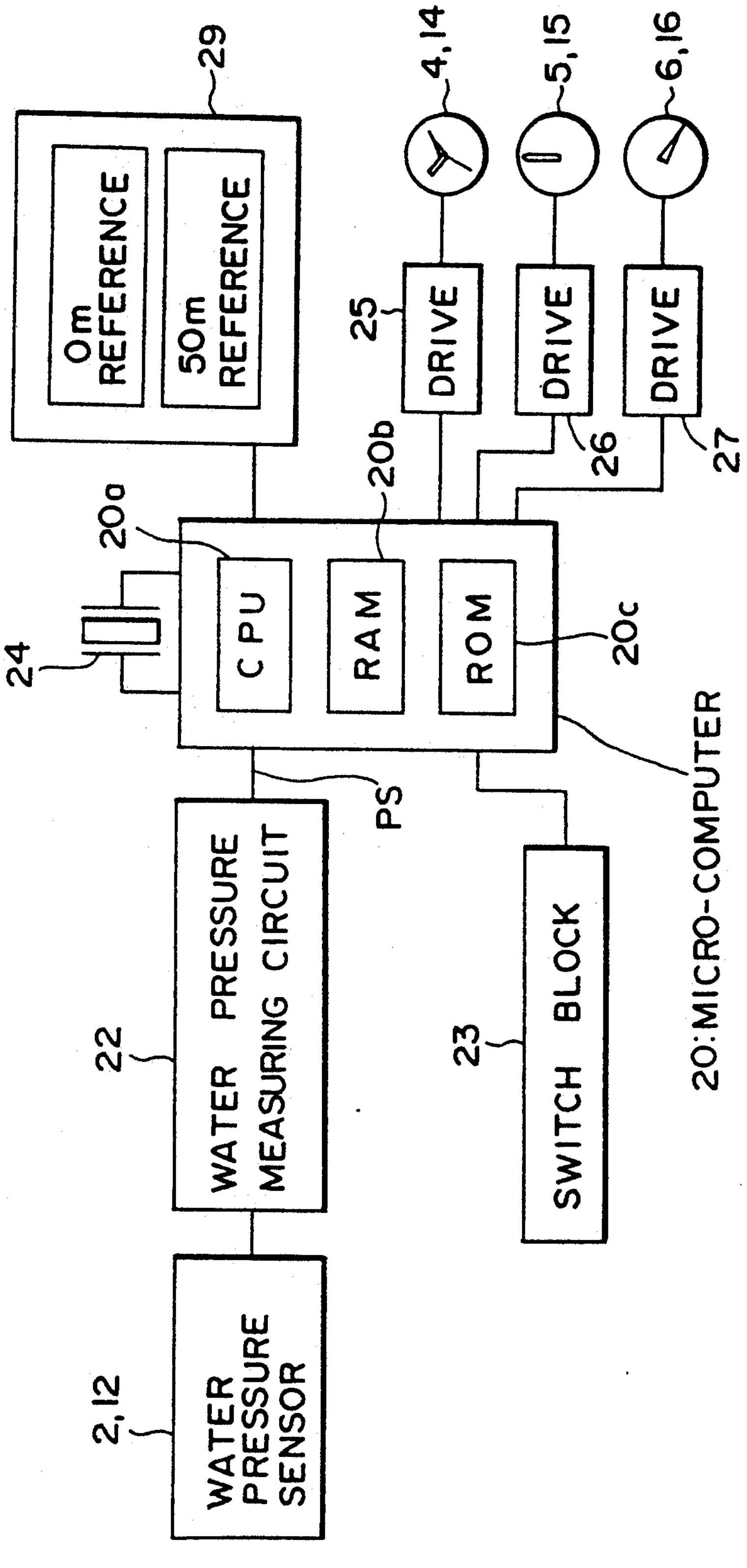
FIG. 3 is a block diagram showing the basic construction of the timepiece shown in FIGS. 1 and 2.

FIG. 3 shows, in a block diagram, the basic arrangement common to the electronic wrist watches shown in FIGS. 1 and 2.

A micro-computer 20 is composed basically of a CPU 20*a*, a RAM 20*b* and a ROM 20*c*. The program controlling the CPU 20*a* is stored in ROM 20*c*. Under the control of the program, the CPU 20*a* fetches date from switch block 23 or exchanges date with an inactive memory 29 or with RAM 20*b* by way of performing a processing operation. If necessary, the CPU 20*a* outputs driving signals to driving units 25 and 26, as later explained.

The inactive memory 29 has stored therein reference values (o m, 50 m) for calculating the depth of water. Water pressure sensors 2, 12 are constituted by diaphragm type semiconductor units outputting electrical sensor signals as a function of fluctuations in the water pressure. A water pressure measurement circuit 22 is constituted by an amplifier circuit and an A/D converter and has sensor signals from sensors 2, 12 and the water depth information Ps as an input and an output, respectively.

The switch block 23 is constituted by a switch controlled by crowns 7, 17 and pushbuttons 8, 9, 18 and 19, shown in FIGS. 1 and 2.

A crystal oscillator 24 generates clock signals. Among three driving units 25 to 27, the driving unit 25 drives time hands 4*a*, 4*b*, 4*c*, 14*a*, 14*b* and 14*c* associated with seconds, minutes and hours, shown in FIGS. 1 and 2, while the driving units 26 and 27 separately drive water depth hands 5 and 15, shown in FIGS. 1 and 2, and maximum water depth hands 6 and 16, shown in FIGS. 1 and 2, respectively.

In the above arrangement, changes in water pressure may be converted into electrical signals so that the water depth may be indicated by the indicating hand by means of the associated driving unit. The maximum water depth reached during diving may also be displayed and held by the maximum water depth indicating hands 6, 16 under control of the micro-computer.

Figure 4:
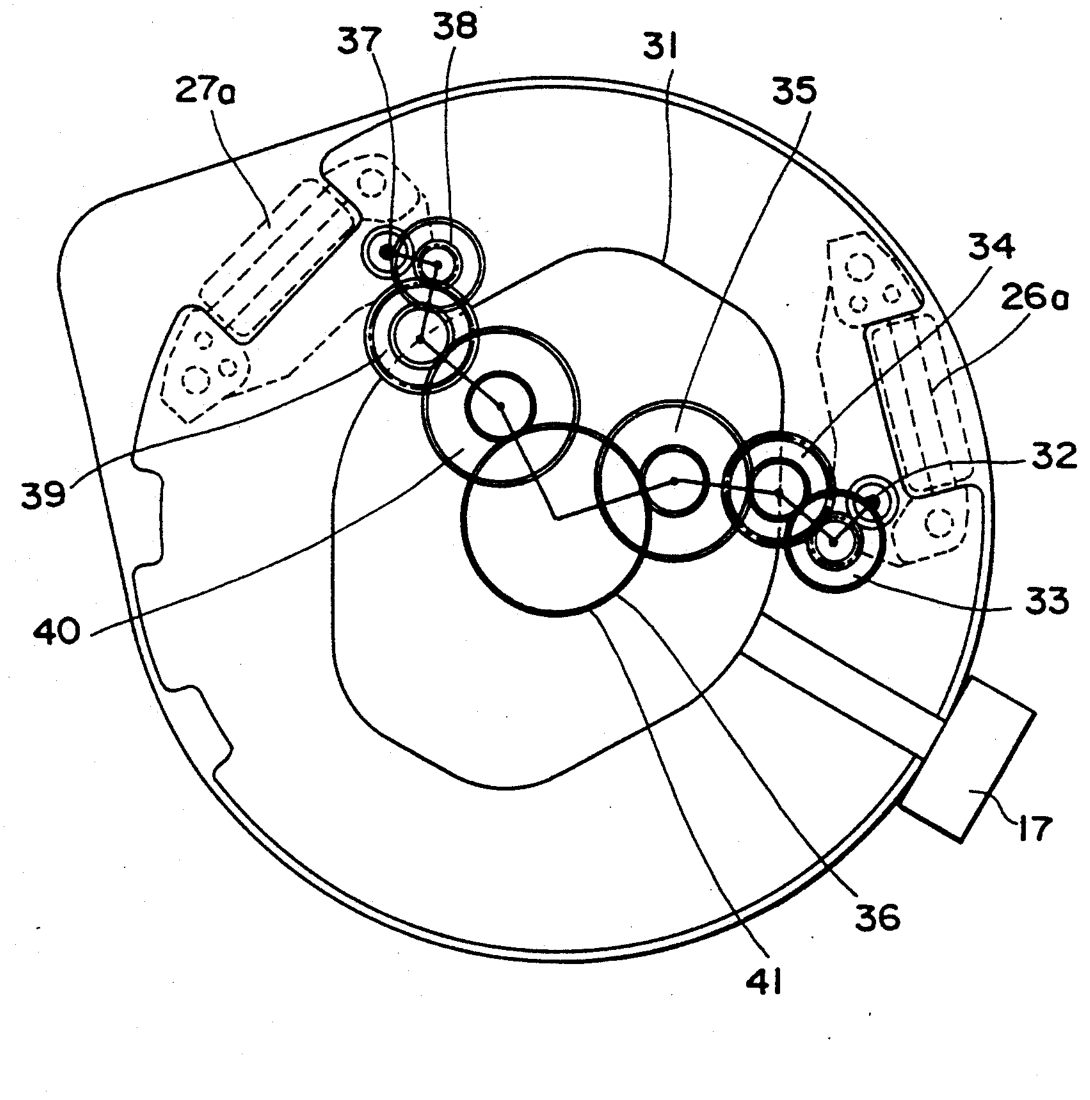
FIG. 4 is a plan view showing a train wheels of the embodiment of the timepiece shown in FIG. 2.

FIG. 4 is a plan view showing the train wheels.

A conventional time indicating module 31 is provided at a mid position, and motors 26*a*, 27*a* as driving units are provided around the time-indicating module. The time indicating module 31 drives the hour hand 14*a*, the minute hand 14*b* and the second hand 14*c*, shown in FIG. 2, for indicating the time to the user. A depth of water rotor 32, rotated by motor 26*a*, drives a depth of water wheel 36 via intermediate wheels (counter wheels) 33 to 35. The depth of water wheel 36 rotates the depth of water hand 15 shown in FIG. 2 to indicate the current water depth to the user. A maximum depth of water rotor 37, rotated by motor 27*a*, drivers a central maximum water depth wheel 41 via counter wheels 38 to 40. The maximum depth of water wheel 41 rotates central maximum water depth hand 16 to indicate the maximum water depth reached during diving to the user.

The water depth wheel 36 and the maximum water depth wheel 41 are of the same type wheels. Similarly, the water depth rotor 32 is of the same type as the maximum water depth rotor 37, the counter wheel 33 is of the same type as the counter wheel 38, the counter wheel 34 is of the same type as the counter wheel 39 and the counter wheel 35 is of the same type as the counter wheel 40, with same the center to center distances.

The train wheels of the water depth hand 5 and the maximum water depth hand 6 shown in FIG. 1 is obtained by extending the axes of selected counter wheels on to the dial surface and fitting the hours or hands thereto, without changing the disposition of the electric motors 26*a* and 27*a* or the order of the counter wheels from the motors 26*a* and 27*a*.

Figure 5:
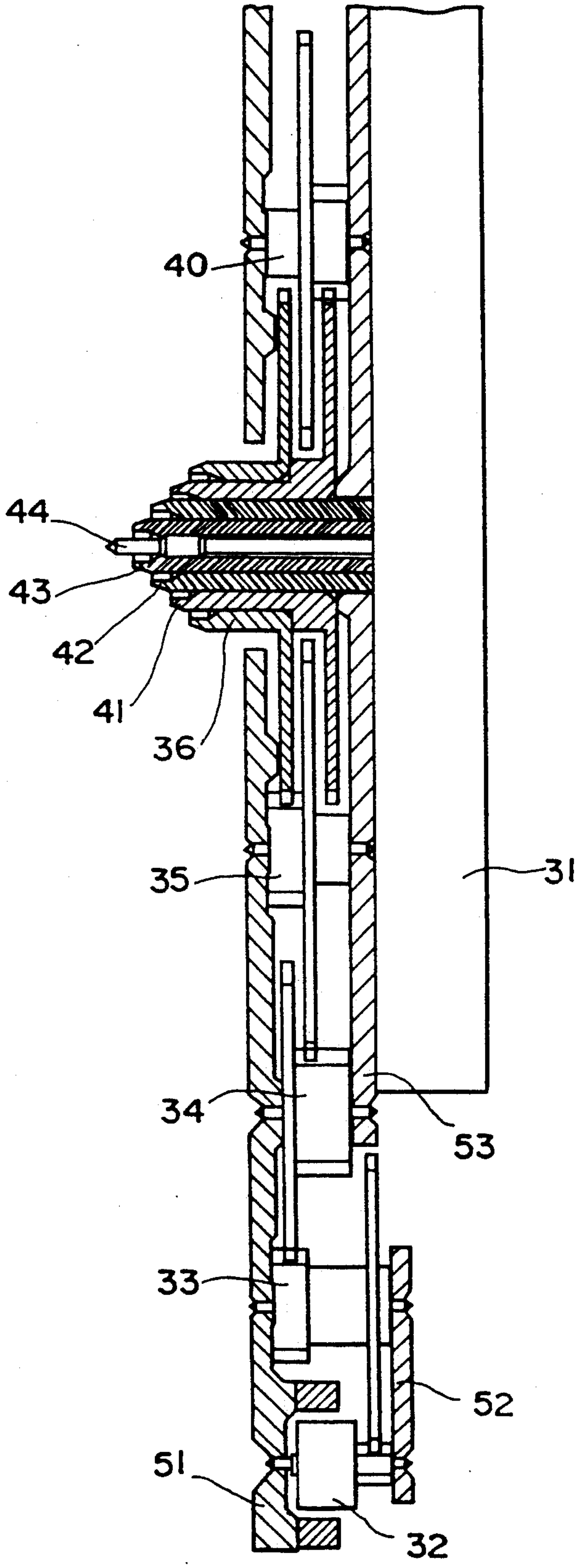
FIG. 5 is a partial cross-sectional view showing the first embodiment of the electronic timepiece shown in FIG. 4 and showing the water depth driving wheel through the mid region to the counter wheels in cross-section.

FIG. 5 is a partial cross-sectional view of FIG. 4, showing the water depth rotor 32 via the mid region as far as the counter wheel 40. A hour wheel 42, a minute wheel 43 and a second wheel 44 at the mid region are extended from the time module 31. The hour wheel 42, minute wheel 43 and the second wheel 44 rotate the hour hand 14*a*, minute hand 14*b* and the second hand 14*c*, respectively.

A bridge 53, connected to the module 31, supports the counter wheels 34, 35 and 40 in cooperation with a bridge 51. The bridge 51 supports the depth of water rotor 32 and the counter wheel 33 in cooperation with the bridge 52.

The partial cross-sectional profile from the counter wheel 40 as far as the maximum water depth rotor 37 is substantially the same as that from the depth of water rotor 32 to the counter wheel 35.

Although the counter wheel 35 is of the same type as the counter wheel 40, these wheels are arranged between a gear of the water depth wheel 36 and a gear of the maximum water depth wheel 41. Thus, the counter wheels 35, 40 are separated from each other in plan view, as shown in FIG. 4, so that the gear surfaces, when at the same height, do not collide with each other. Since the wheel pinion of the counter wheel 35 meshes with a gear of the water depth wheel 36, and the counter wheel 40 meshes with a gear of the maximum water depth wheel 41, the wheel pinion direction is reversed with the gear surfaces of the counter wheels 35 and 40 as the boundary. In this manner, it does not occur that solely the water depth wheel 36 or solely the maximum water depth wheel 41 is not rotated, even although the counter wheels 35, 40 are of the same type. By reversing the wheel pinion mounting direction, the counter wheel 35 drives solely the water depth wheel 36 and the counter wheel 40 drives solely the maximum water depth wheel 41.

Figure 6:
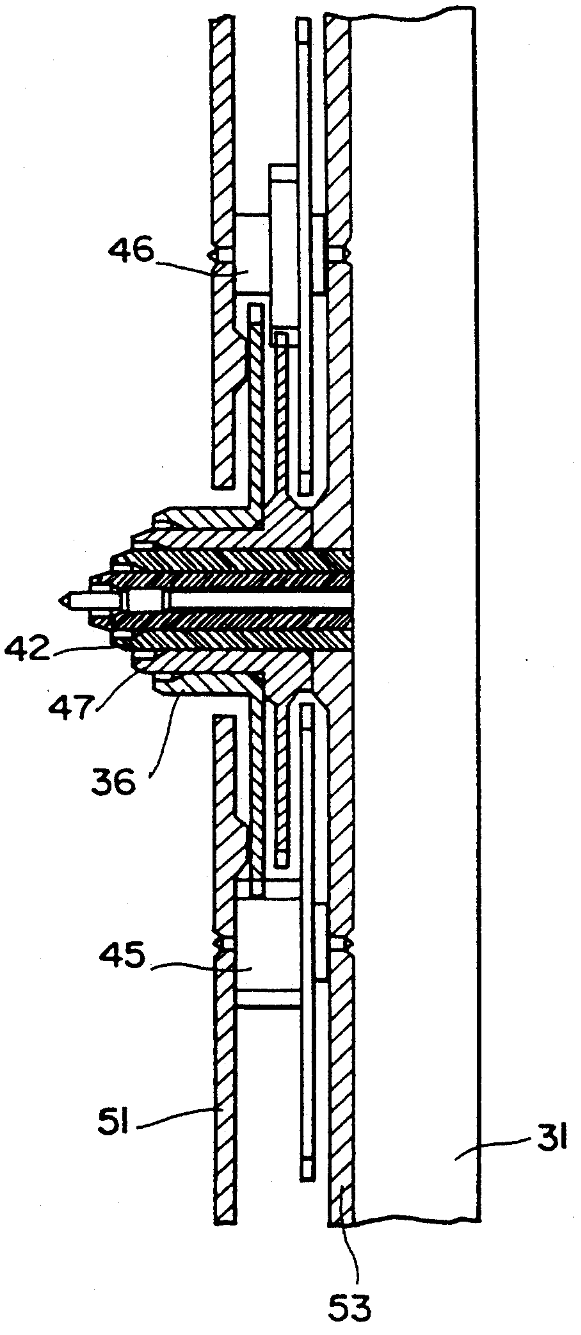
FIG. 6 is a partial cross-sectional view showing the first embodiment of the electronic timepiece shown in FIG. 5 and showing a modified maximum water depth wheel and modified counter wheels.

FIG. 6 is a cross-sectional view when the maximum water depth wheel 41, counter wheel 35 and the counter wheel 40 are changed, that is, when the counter wheel 35 is of the type different from counter wheel 40. The other counter wheels and the motors are the same as those in the cross sectional view of FIG. 5.

The counter wheel 45 has its gear meshing with the wheel pinion of the counter wheel 34 and its wheel pinion meshing with the gear of the water depth wheel 36. The counter wheel 46 has its gear meshing with the wheel pinion of the counter wheel 39 and has its wheel pinion clearing the gear of the water depth wheel 36 and meshing with the maximum water depth wheel 47. Thus the counter wheel 45 rotates solely the water depth wheel 36, while the counter wheel 46 rotates solely the maximum water depth wheel 47.

It will be understood from FIGS. 4, 5 and 6 that the train wheels from one of the motors to the functional hand has the center-to-center distances of the counter wheels in common with those of the train wheels from the other motor to the associated functional hand.

With the present electronic wrist watch fitted with the functional hands, by calculating the depth of water by the water pressure sensor and transmitting the depth of water thus calculated into the hand by an electromechanical transducer, the water depth synchronized with the divers movements in the water and the maximum water depth may be continuously indicated by the water depth hand and the maximum water depth hand, respectively, so that the diver may easily read the diving time, the current water depth and the maximum water depth.

Meanwhile, a temperature sensor may be used as an information sensor in place of the water depth meter as in the above described embodiment for indicating the current temperature and the maximum or minimum temperature. Alternatively, an atmospheric pressure sensor may be used for simultaneously indicating the current atmospheric pressure and the atmospheric pressure at an optional past time.

A second embodiment, explained hereinbelow, is directed to an electronic wrist-watch in which the fast feed speed of the motor of the functional system and the speed reduction ratio of the train wheels are optimized to permit the function hands to be moved quickly for water depth indication responsive to the measured water depth during diving, and in which the motor of the functional system and the train wheels are arranged to reduce the size and the thickness of the timepiece movement.

Figure 7:
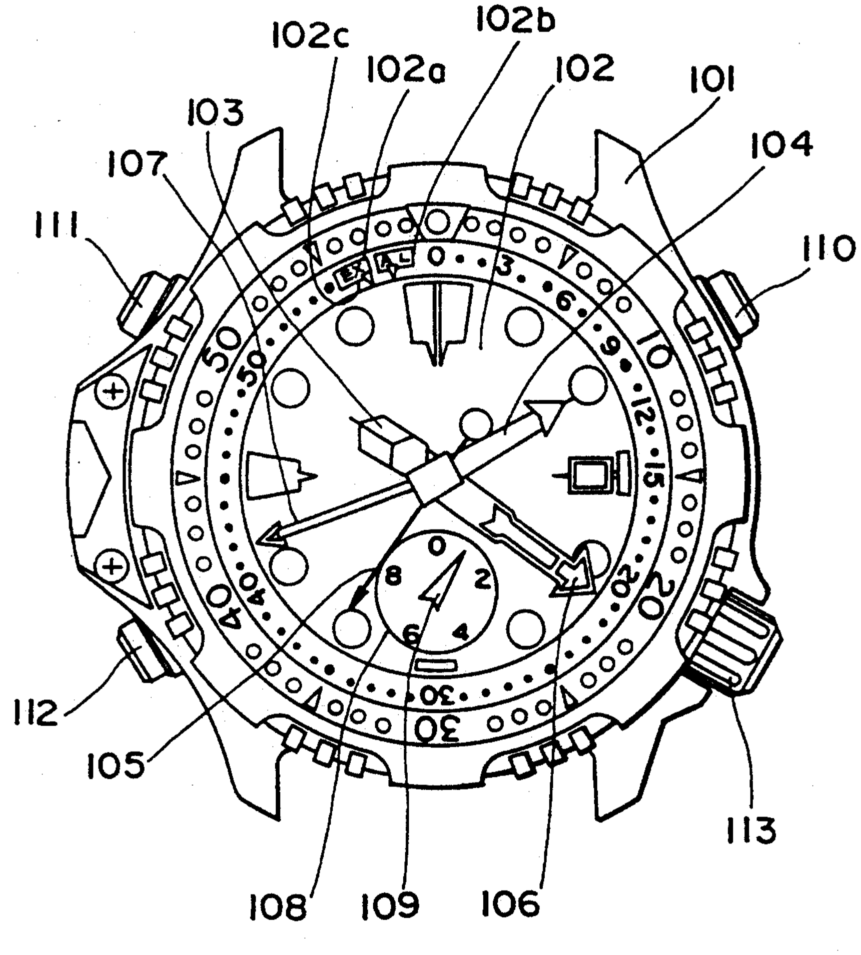
FIG. 7 is a front view showing a second embodiment of the electronic timepiece having functional hands.

In an electronic wrist-watch, shown in FIG. 7, minute graduations, which may be used simultaneously as water depth graduations, are provided on the circumference of a dial 102 of a casing 101. The water depth indicating unit is 1 m per minute graduation. The water depth is displayed in a region from the twelve o'clock position (0 m graduation position) to a 55 minute graduation position. An "EX" mark indicating the ordinary time mode, an "AL" mark indicating a depth alarm setting mode and a display mark 102*c* indicating an excess water depth measurement, are provided between the 55 minute graduation position and the twelve o'clock position.

An hour hand 103, a minute hand 104 and a second hand 105, as the time indicating hands, and a water depth hand 106 and a maximum water depth hand 107, which may be used simultaneously as a mode indicating hand, are provided at a mid region of the dial 102. A small dial 108 has water depth graduations with an interval of 0.1 m as a unit, which may be pointed by a subsidiary water depth hand 109 provided at the mid region. Pushbuttons 110, 111, 112 and a crown 113 constitute external operating members for correction.

On switching to a water depth measurement mode by operation of the exterior operating members, the water depth measurement state is set for measuring the diving water depth. The water depth hand 106 and the subsidiary water depth hand 109 indicate the current diving depth, while the maximum water depth hand 107 perpetually indicates the maximum diving water depth , by operating as a "setting" hand.

Figure 8:
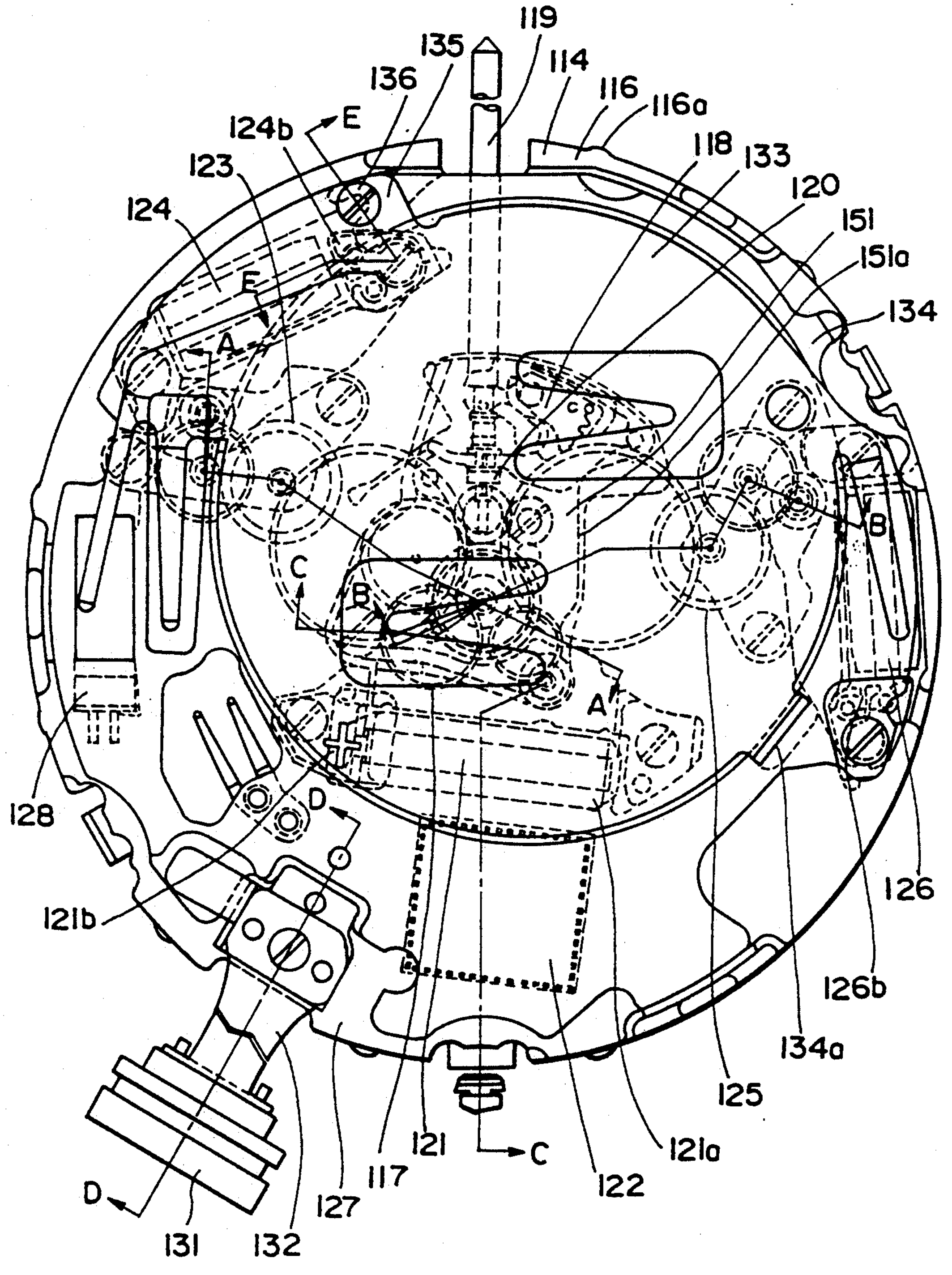
FIG. 8 is a top plan view showing a timepiece movement of an electronic timepiece provided with functional hands according to a second embodiment of the present invention.
Figure 9:
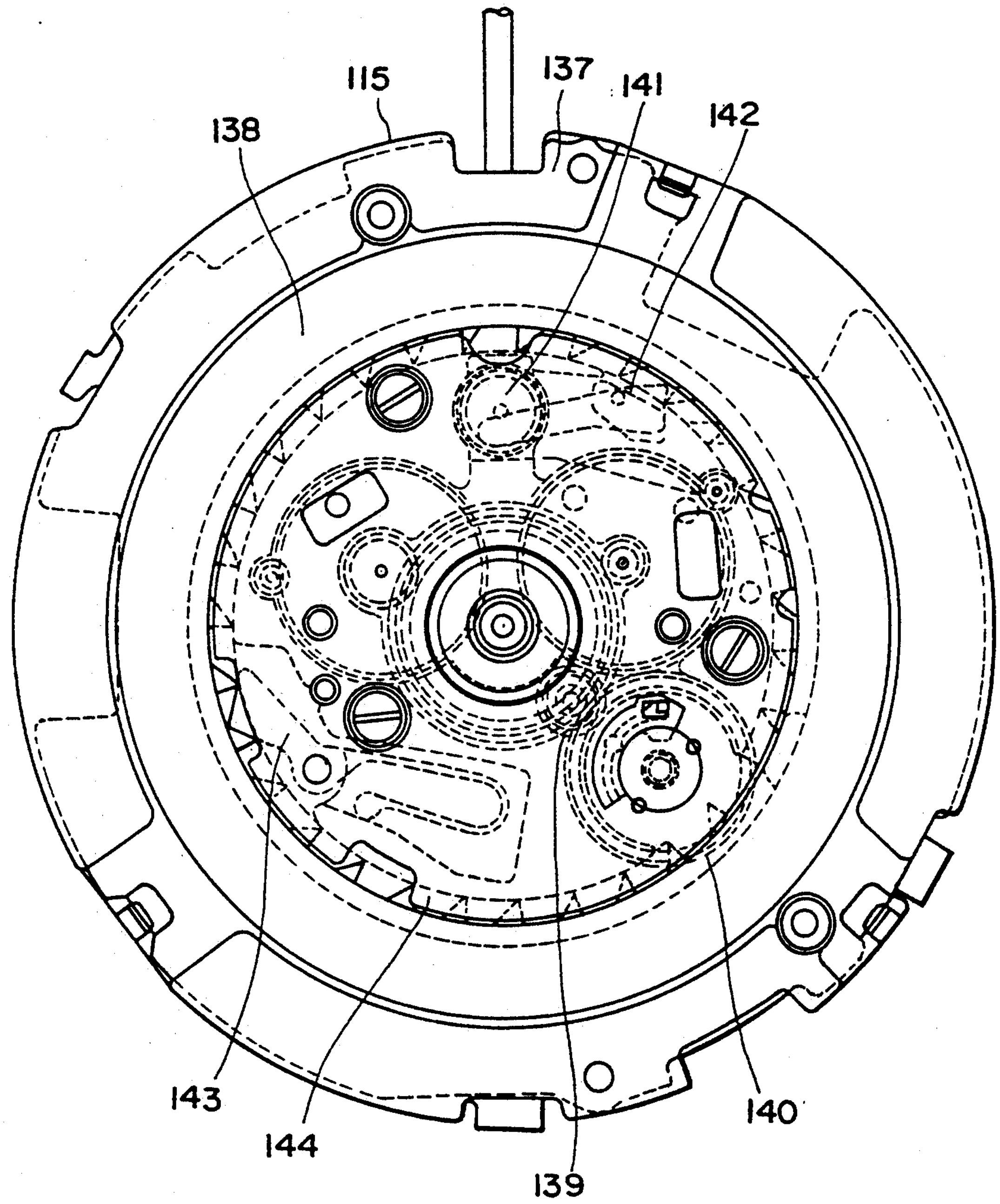
FIG. 9 is a bottom view showing a timepiece movement of the electronic timepiece provided with functional hands according to the second embodiment.

FIG. 8 is a plan view of a timepiece movement 114 of an electronic wrist watch fitted with functional hands of the present invention. A timepiece movement 114 is engaged with an inner region of a case 101 by several lugs 116*a* provided on an outer periphery of a circuit support 116 provided on a timepiece base plate 115. At a mid region of the base plate 115, there are provided a timepiece motor 121, a timepiece train wheels 117 driven by the motor 121 and a indicating hand correction mechanism 118.

A winding stem 119, secured to a crown 113, is positioned by hand correction mechanism 118 at three stages, that is at an ordinary time indicating position, a calendar correcting position and at a hand setting position. At the hand setting position of the winding stem 119, a clutch wheel 120, interlocked with the rotation of the winding stem 119, is engaged with the hand correcting train wheels, in a manner not shown, so that the hand may be corrected by rotating the crown 113. A coil 121*a* and an IC chip 122 as timepiece motor are provided on an extension of the winding stem 119.

A depth of water motor 124 effects fast feed of a water depth train wheels 123, indicating the current diving depth, by output signals from the circuit. A water depth motor 126 effects fast feed of a maximum water depth train wheels 125, indicating the maximum diving depth, by output signals from the circuit. A circuit board 127 is provided for overlying a substantially entire surface of the timepiece base plate 115.

On the circuit board 127, which is patterned, there are set circuit components, such as IC chip 122, a crystal oscillator 128 etc. The circuit board 127 is electrically connected to a terminal part 121*b* of a timepiece coil 121*a*, a water depth motor 124 of the functional system, coil terminals 124*b*, 126*a* of the maximum water depth motor 126 and a connection sheet 132 soldered to a water pressure sensor 131. A battery 133 is a flat lithium battery which is retained by a battery supporting frame 134 provided on the circuit board 127 and which is secured by a set screw 136 of a battery retainer 135 and a hook 134*a* provided on the battery supporting frame 134.

A calendar mechanism, provided on a dial side of the timepiece base plate 115, is constituted by a calendar plate, date plate 138, an intermediate date transmission wheel 139, an intermediate date wheel 140, a quick correction wheel 141, a quick correction lever 142, a daily star lever and a back plate 144.

Figure 10:
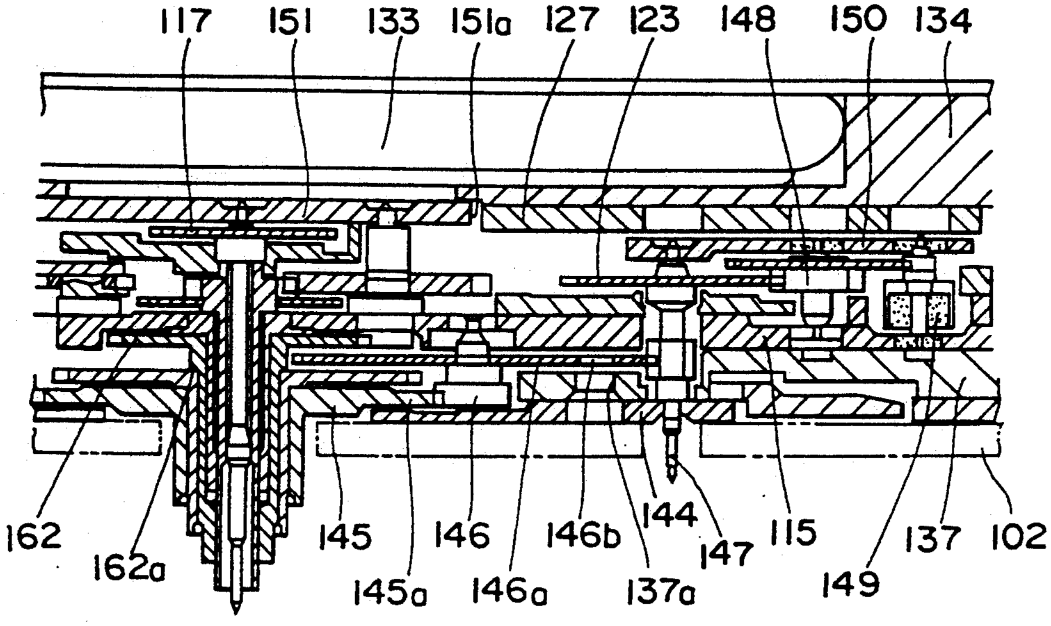
FIG. 10 is a cross-sectional view, taken along line A—A of FIG. 8, and showing the depth train wheels mechanism of the electronic timepiece of the second embodiment.

FIG. 10 shows a water depth train wheels in a cross-sectional view along line A—A of FIG. 8.

A water depth train wheels 123 is made up of a water depth wheel 145, fitted with a water depth hand 106, a water depth counter wheel 146, a subsidiary water depth wheel 147, a subsidiary water depth counter wheel 148, and a water depth rotor 149. Among these, the components from the subsidiary water depth wheel 147 to an upper pivot of the water depth rotor 149 are supported by a water depth train wheels support 150. A gear part 145*a* of the water depth wheel 145, the water depth counter wheel 146 and a lower pivot of the subsidiary water depth wheel 147 are supported by the back plate 144.

The water depth train wheels support 150 is set so as to be lower in height level than the timepiece train wheels support 151, and the circuit board 127 is stacked on the support 150. The circuit board 127 is set so as to be on the same cross-sectional height as the train wheels support 151.

A gear part 146*a* of the water depth counter wheel 146 and the calendar plate 137 are provided with orifices 146*b*, 137*b*, so that it can be checked from the relative position of the orifices if, when the train wheels of the functional system is rotated by fast feed for a predetermined number of revolutions, the train wheels have been rotated normally without motor misfeeds.

Figure 11:
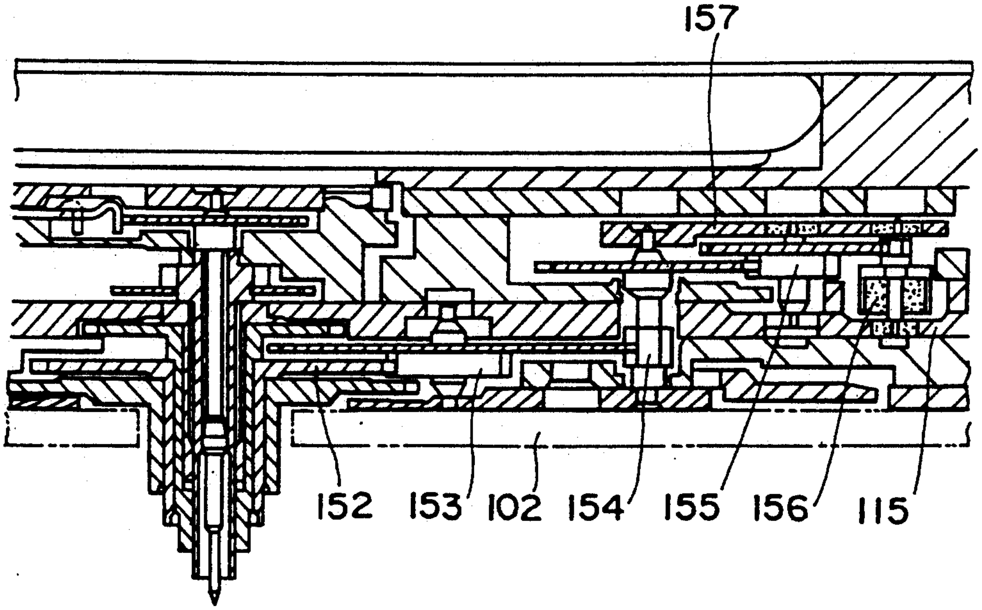
FIG. 11 is a cross-sectional view, taken along line B—B of FIG. 8, and showing the maximum depth train wheels mechanism of the electronic timepiece of the second embodiment.

FIG. 11 shows the maximum water depth train wheels in a cross-sectional view taken along line B—B in FIG. 8.

The maximum water depth train wheels are made up of a maximum water depth wheel 152 fitted with a maximum water depth hand 107, a maximum water depth counter wheel 153, a maximum water depth counter wheel 154 and a maximum water depth counter wheel 155, and are disposed at the same height level as the water depth train wheels 123. The maximum water depth rotor 156 and the maximum water depth train wheels support 157 are at the same height level as the water depth rotor 149 and the water depth train wheels support 150 in the water depth train wheels 123.

Figure 12:
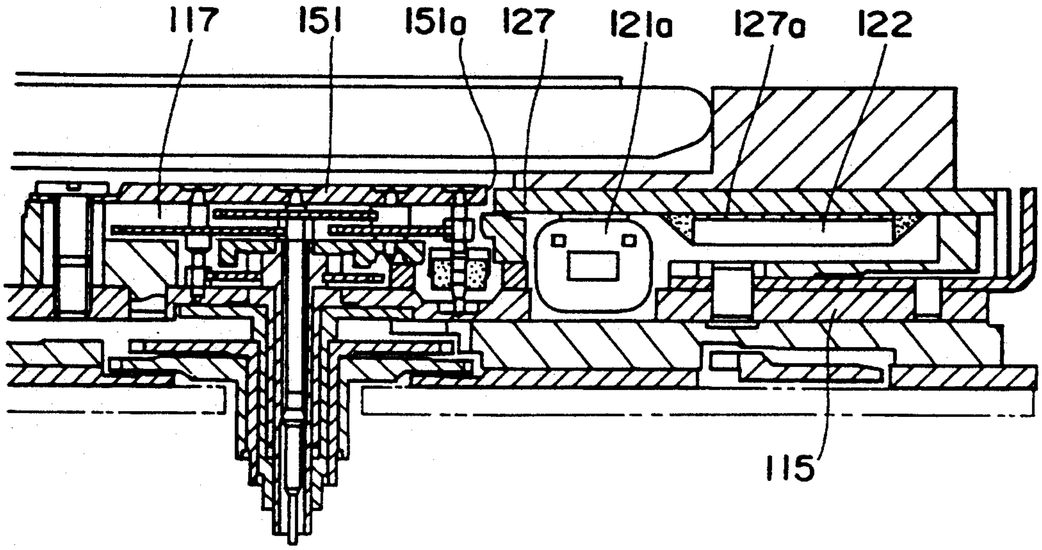
FIG. 12 is a cross-sectional view, taken along line C—C of FIG. 8, and showing the train wheels, IC chip and the coil of the electronic timepiece of the second embodiment.

FIG. 12 is a cross-sectional view taken along line C—C of FIG. 8.

The train wheels support 151 supports an upper pivot of the timepiece train wheels 117. An outer profiled section 151*a* of the train wheels support 151 is provided in proximity to and at the same hight level as the circuit board 127. A timepiece coil 121*a* is provided between the lower surface 127*a* of the circuit board 127 and the timepiece base plate 115, and an IC chip 122 is attached to lower surface 127*a* of the circuit board 127.

Figure 13:
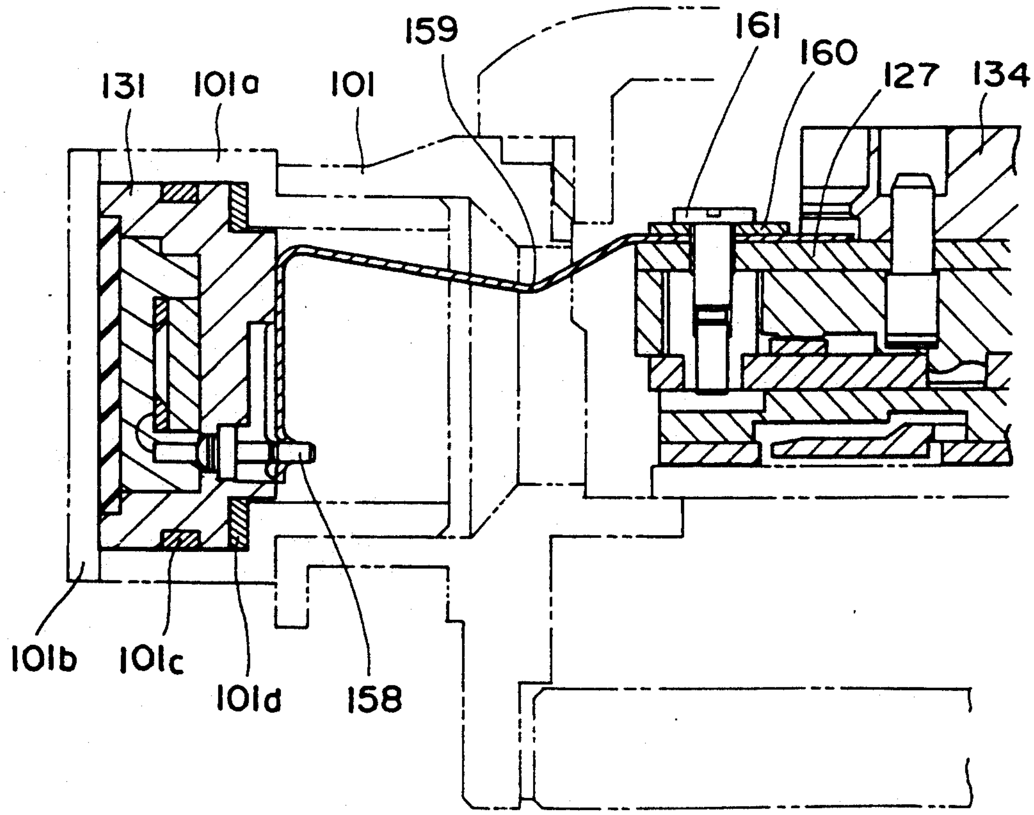
FIG. 13 is a cross-sectional view taken along line D—D of FIG. 8 and showing the connecting part between the water pressure sensor and the circuit board of the electronic timepiece of the second embodiment.

FIG. 13 is a cross sectional view taken along line D—D of FIG. 8.

A water pressure sensor 131 is inserted into a pipe 101*a* secured to an opening on the lateral surface of the case 101. The water pressure sensor 131 and the circuit board 127 are electrically connected to each other by setting an end part of a connection sheet 159 soldered to a lead terminal 158 of the sensor 131 on the circuit board 127 and setting the end part via sensor retainer 160 by a set screw 161.

The water pressure sensor 131 is retained by a sensor 101*b*, and a reliable dual packing water-proofing structure is produced by compressing packings 101*c*, 101*d* in radial and thrust directions, respectively.

Figure 14:
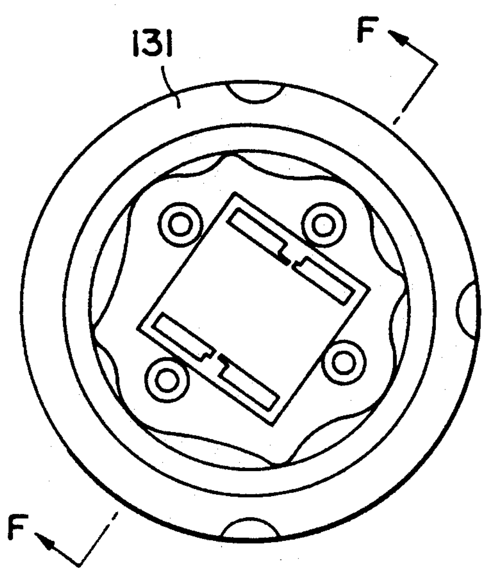
FIG. 14 is a top plan view showing the water pressure sensor of the electronic timepiece of the second embodiment.
Figure 15:
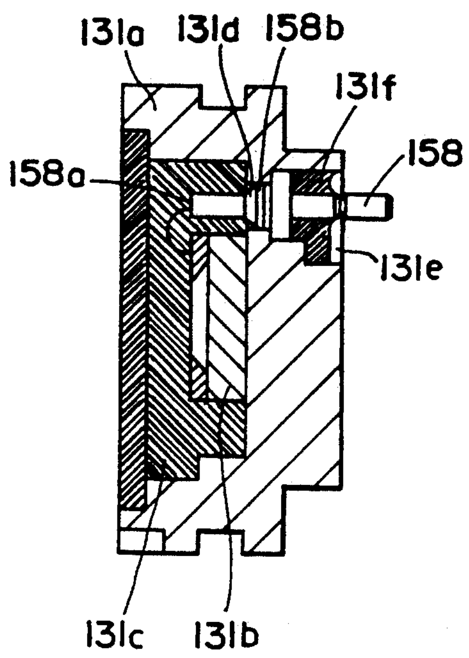
FIG. 15 is a cross-sectional view taken along ling F—F in FIG. 14 and showing the water pressure sensor of the electronic timepiece of the second embodiment.
Figure 16:
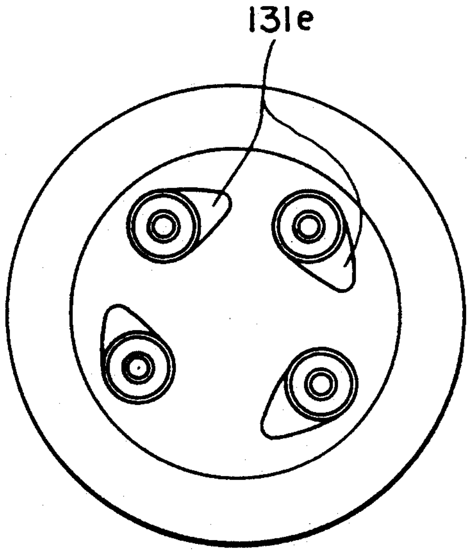
FIG. 16 is a bottom plan view showing the water pressure sensor of the electronic timepiece of the second embodiment.
Figure 17:
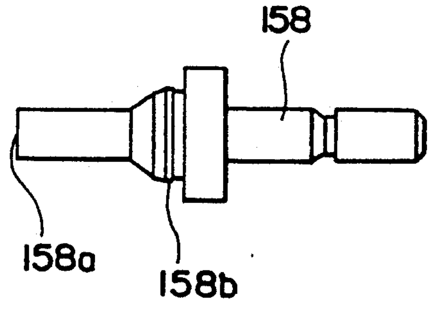
FIG. 17 is a side view showing a lead terminal of FIG. 15.

FIGS. 14 and 16 are upper and lower views of the water pressure sensor, FIG. 15 is a cross-sectional view taken along lines F—F in FIG. 14 and FIG. 17 shows details of a reed terminal shown in FIG. 15.

The water pressure sensor 131, outputting electrical sensor signals by a diaphragm type semiconductor sensor responsive to fluctuations in water pressure, is made up of a package 131*a*, a sensor chip 131*b* and a reed terminal 158. The upper surface of the water pressure sensor 131 is wire bonded to sensor chip 131*b* and to one end 158*a* of the lead terminal 158 provided with an electrode surface, and is sealed with a gel-like silicon rubber 131*c*. A profiled part 158*b* of the reed terminal 158 is press-fitted into a two-stage opening 131*d* on the lower surface of the water pressure sensor 131 and is hermetically sealed by an adhesive 131*f* to a groove 131*e*.

Figure 18:
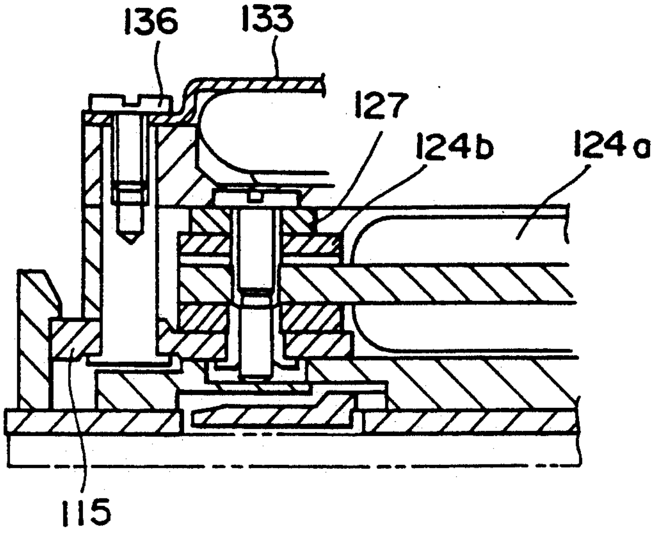
FIG. 18 is a cross-sectional view taken along line E—E of FIG. 8 and showing a timepiece coil part of the electronic timepiece of the second embodiment.

FIG. 18 is a cross-sectional view, taken along line E—E of FIG. 8.

A water depth coil 124*a* is provided between the circuit board 127 and the timepiece base plate 115.

Figure 19:
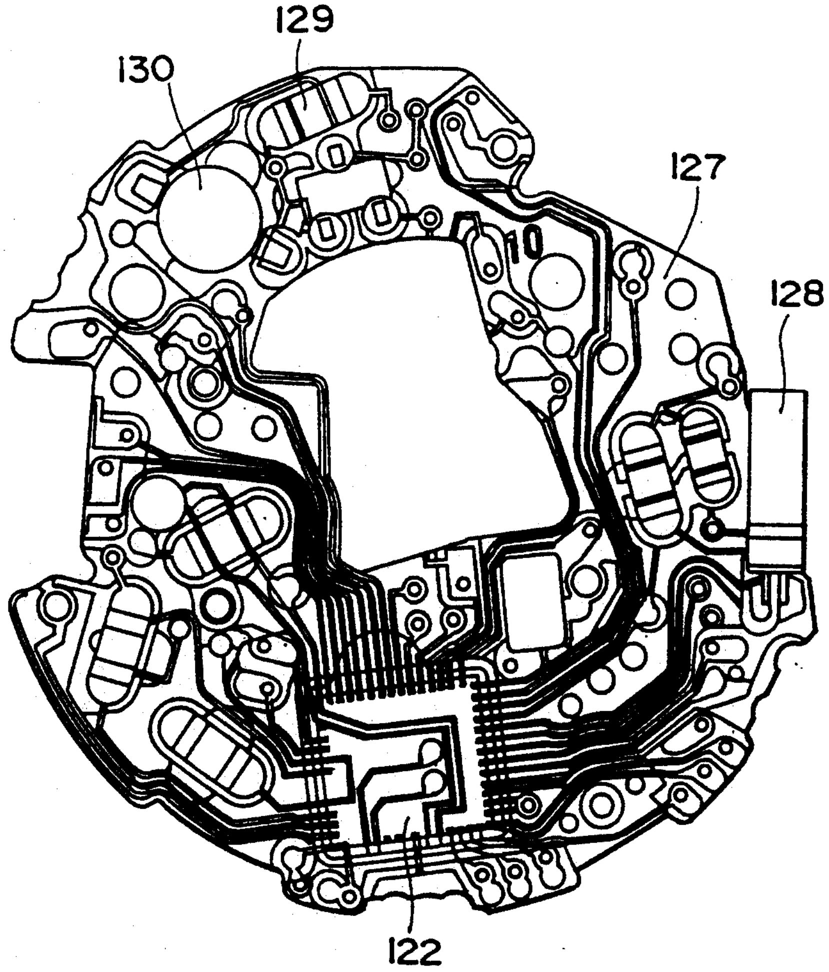
FIG. 19 is a bottom plan view showing a circuit board of the electronic timepiece of the second embodiment.

FIG. 19 shows the lower surface of the patterned circuit board.

An IC chip 122, a crystal oscillator 128, a capacitor chip 129 and a boost coil for buzzering 130 are mounted on the circuit board 127.

In a water depth measurement mode, the water pressure sensor 131 outputs electrical sensor signals responsive to fluctuations in the water pressure. A water pressure measurement circuit, made up of an amplifier and an A/D converter, receives the sensor signal to deliver an output signal to the micro-computer, which then outputs driving signals to a water depth motor 124 and a maximum water depth motor 126, based on the water depth information derived from a processing operation, for thereby driving the water depth hand 106 and the maximum water depth hand 107 with fast feed.

Figure 20:
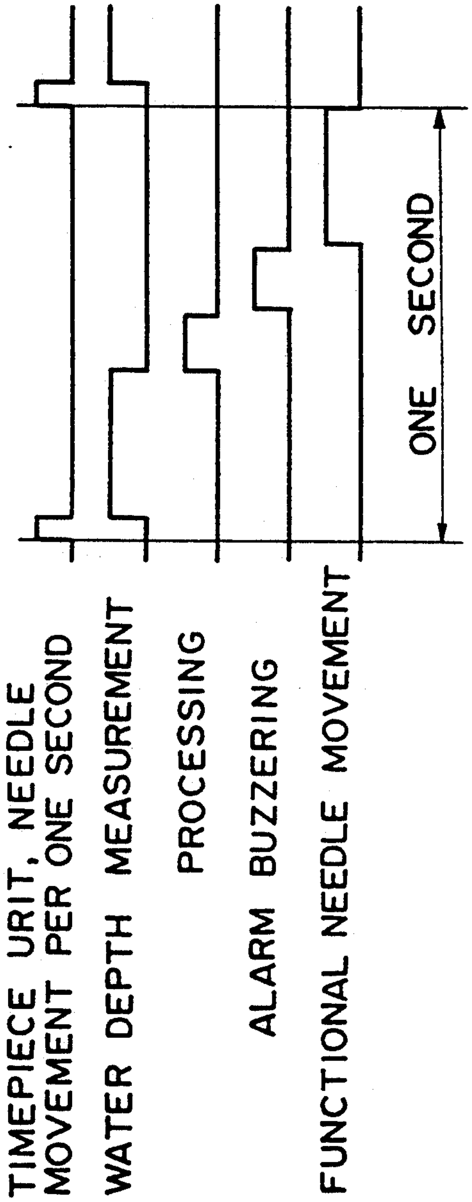
FIG. 20 is a timing chart showing a water depth measurement system of the electronic timepiece of the second embodiment.

FIG. 20 is a time chart for illustrating the operation of a water depth measurement system. The movement of the timepiece hands, water depth measurement processing, alarm buzzering and the movement of the water depth hand and the maximum water depth hand are separately effectuated at an interval of one second to avoid heavy battery loading during operation. The fast feed speeds of the water depth motor 124 and the maximum water depth motor 126 are 64 Hz and 32 Hz for forward and reverse feeds, respectively, the speed reduction ratio from the water depth rotor 149 of the water depth train wheels 123 to the subsidiary water depth wheel 147 is 1/20, the speed reduction ratio from the water depth rotor 149 via subsidiary water depth wheel 147 to the water depth wheel 145 is 1/1200 and the speed reduction ratio from the maximum water depth rotor 156 of the maximum water depth train wheels 125 to the maximum water depth wheel 152 is 1/600.

Since the water depth indication is at a rate of 1 m per minute graduation on the dial 102, the number of steps per 1 m water depth of the water depth motor 124 is 1200 (speed reduction ratio) ×2 (number of steps of one rotor revolution) / 60 m ( water depth corresponding to one revolution of the water depth hand)=40. Thus, with the usual diving and floating speeds in scuba diving equal to about 30 cm per second, the time necessary for the water depth hand 106 to be moved for a depth of 30 cm is 0.3 m×40 steps / 64 Hz=0.1875 sec for diving (forward feed) and 0.3 m ×40 steps / 32 Hz=0.375 sec for floating (reverse feed). Since the speed reduction rate of the maximum water depth train wheels 125 is one half that of the water depth train wheels 123, the time necessary to cause movement of the maximum water depth hand 107 is one half that necessary to cause movement of the water depth hand.

In this manner, since the ordinary diving and floating speeds in scuba diving are less than 30 cm/sec, the water depth hand 6 can be made to follow the changing water depths by time division within one second, even if water depth is measured once every second, as shown by a timing chart shown in FIG. 20.

FIG. 20 is a time chart showing the operation of the electronic wrist watch fitted with functional hands.

With the present electronic wrist watch, the hand-advancing pulse for each second, a water depth measurement circuit pulse for water depth measurement, a processing pulse, an alarm buzzering pulse, and hand-advancing pulses for the water depth hand and the maximum water depth hand, are generated independently of one another for avoiding heavy battery loading during operation.

Referring to FIG. 7, the water depth hand 106 may be distinguished by its shape from the minute hand 104, and is thicker and longer than the minute hand 104 so as to be viewed easily even in case of hand overlapping. Thus the cantilever weight is increased as compared to noctilucent hands used for ordinary diving applications. However, hand skipping due to impacts or the like may be avoided by setting the speed reduction ratio from the water depth rotor 149 to the water depth wheel 145 fitted with the water depth hand 106 to 1/1200.

On the other hand, hand skipping due to cantilevered weight of the subsidiary water depth hand 109 may also be avoided by setting the speed reduction ratio from the water depth rotor 149 to the subsidiary water depth wheel 147 fitted with the subsidiary water depth hand 109 to 1/20. As shown in FIG. 7, the maximum water depth hand 107 has a shape distinguishable from the minute hand 104 and the water depth hand 106 and is of the same length and of a smaller width than the water depth hand 106 so as to be viewed even when overlapped with the water depth hand 106. Since the cantilevered weight of the maximum water depth hand 107 is about one half of that of the water depth hand 106, hand follow-up movement is facilitated by setting the speed reduction ratio from the maximum water depth rotor 156 to the water depth wheel 145 fitted with the water depth hand 106 to 1/600.

Referring to FIGS. 10 and 11, the present electronic wrist watch is so constructed that the maximum water depth wheel 152 and the water depth wheel 145 are stacked on a step 162*a* of the hour wheel 162, and the outer diameter of the gear 152*a* of the maximum water depth wheel 152 is selected to be smaller than the bottom diameter of the gear 145*a* of the water depth wheel 145. Thus, when viewed in cross-section, closest to the dial 102 is the water depth hand 106, followed by the maximum water bottom hand 107, hour hand 103, minute hand 104 and second hand 105, these hands and hands being arranged coaxially.

Turning to the speed reduction ratio of each functional train wheels, if the values of 1/1600 and 1/900 for the water depth train wheels and for the maximum water depth train wheels, corresponding to about 30 percent of the optimum values, are exceeded, follow-up movement of the corresponding functional hands for water depth measurement per second is worsened. On the other hand, if the speed reduction ratio is set to less than 1/900 for the water depth train wheels and to less than 1/400 for the maximum water depth train wheels, which correspond to about 30 percent of the optimum values, hand skipping becomes more likely to be produced due to impacts or the like.

With the above described second embodiment of the electronic wrist watch of the present invention, the motor of the timepiece system and the train wheels as well as the motor of the functional system are arranged between the timepiece base plate and the circuit board arranged at the same cross-sectional height level as the train wheels support, and a part of the train wheels of the functional system is provided between the back plate and the timepiece base plate taking up the thickness of the calendar part. In this manner, the timepiece movement is not affected in any manner, so that the timepiece movement may be reduced in thickness. Also, since the coil of the timepiece system is arranged at right angles to the lower part of the circuit board on a line of extension of the winding stem, and the IC chip is arranged in proximity to the coil, a wide space for the circuit board may be provided around the IC chip to facilitate pattern interconnection. Besides, since the flat type Li battery is provided on the circuit board, the timepiece movement may be reduced in size.

In addition, with the electronic wrist watch of the present embodiment, by optimizing the speed reduction ratio and forward/reverse fast feed speed of the water depth train wheels, causing movements of the water depth hand, and the maximum water depth hand, water depths such as current water depth and maximum water depth during diving can be indicated quickly to enable hand indication with good follow-up, while the water depth meter and the maximum water depth system may be designed with an easy-to-view shape without the risk of hand skipping.

Meanwhile, the speed reduction ratio of the water depth train wheels may be set to 1/1600 to 1/900, while that of the maximum water depth train wheels may be set to 1/900 to 1/400, without any practical problems. Besides, in the operation of the water depth measurement system ,second hand movements, water depth measurement and functional hand movements are effectuated separately so that the battery is subject to lesser load fluctuations and hand movements may be stabilized against temperature changes.

Figure 21:
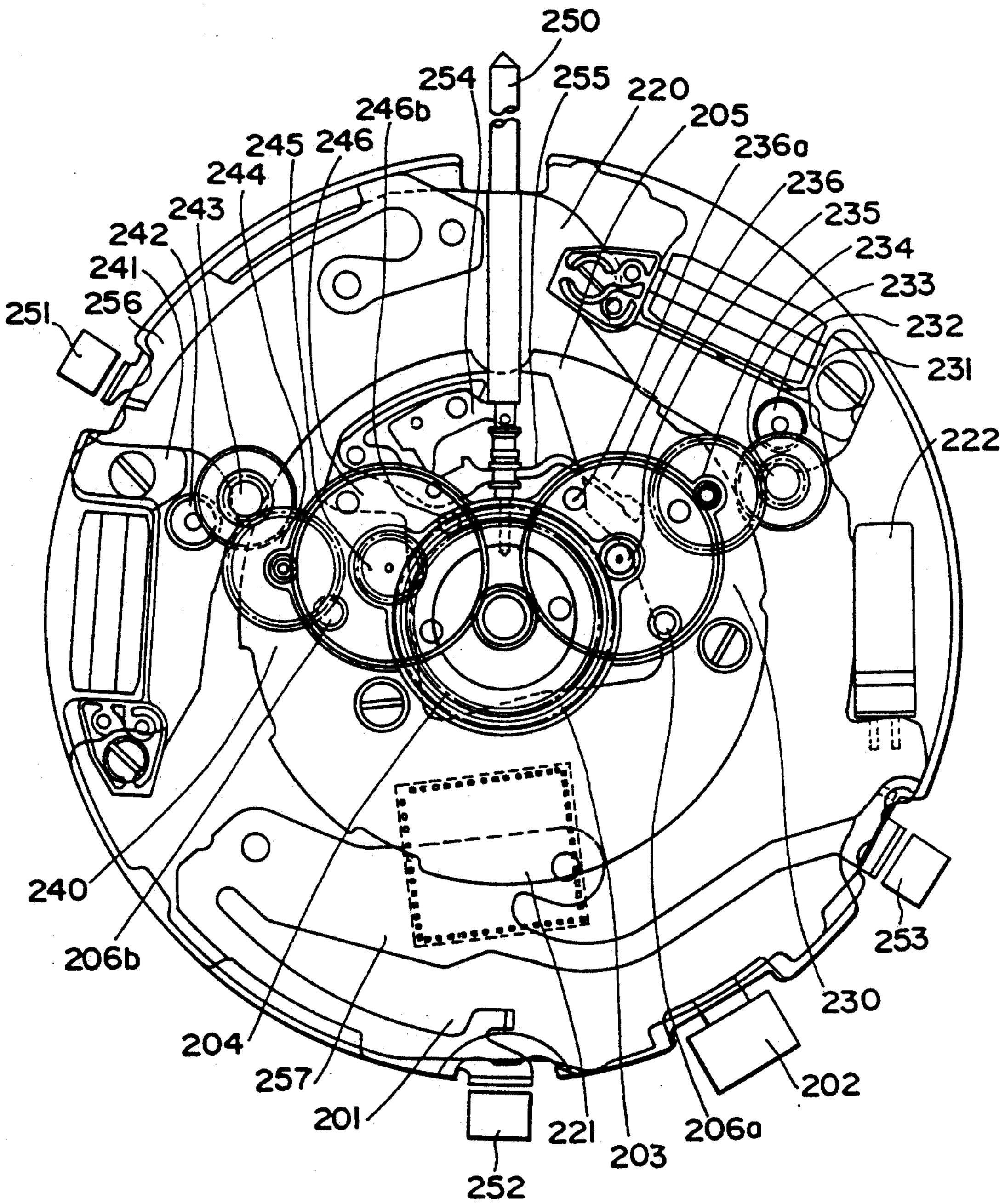
FIG. 21 is a plan view showing a movement of an electronic timepiece according to a third embodiment of the present invention.

A third embodiment of the present invention, shown in FIGS. 21 et seq., is directed to an electronic wrist watch adapted for effectuating inspection of the train wheels rotation by the timepiece movement per se.

Figure 22:
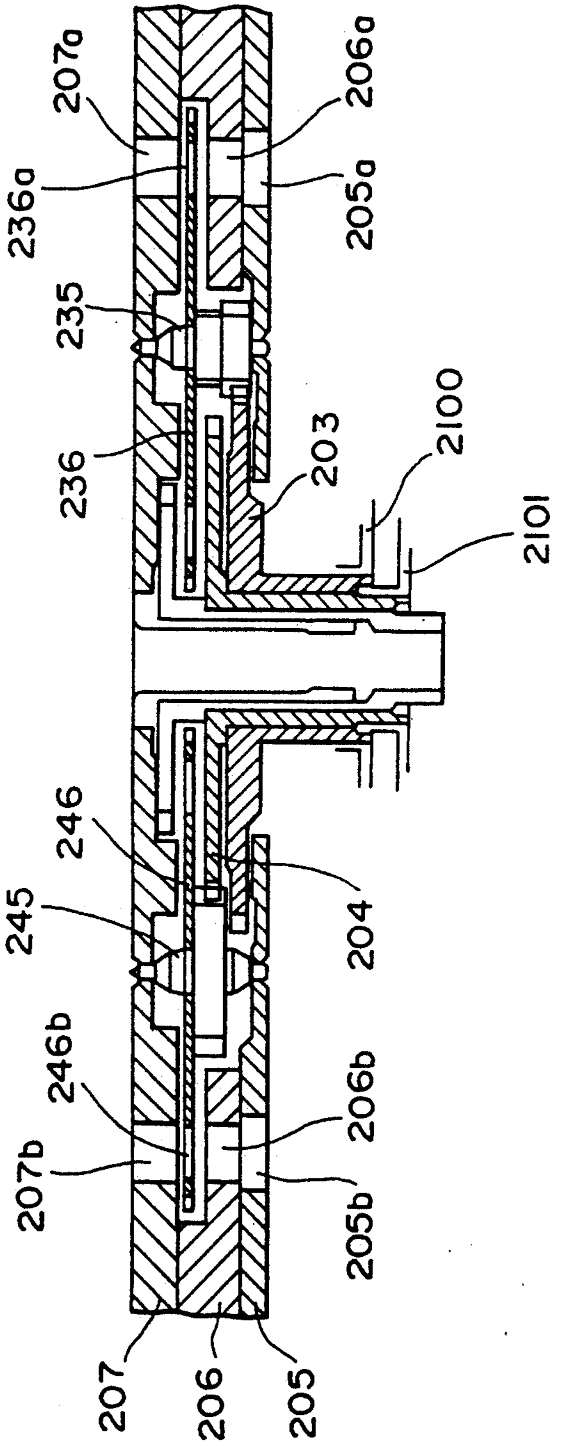
FIG. 22 is a cross-sectional view showing a movement of the electronic timepiece of the third embodiment.

Referring to FIGS. 21 and 22, an electronic wrist watch has time indicating hands at the mid part of a movement 201, and includes a water depth wheel 203 and a maximum water depth wheel 204 adapted for driving a water depth indicating hand 2100 and a maximum water depth indicating hand 2101 adapted for indicating the water depth and the maximum water depth as sensed by a water pressure sensor 202. A winding stem 250, when pulled, actuates a setting lever 254 and a clutch lever 255. Pushbuttons 251, 252, 253, when thrust, actuate switch levers 256, 257 for controlling an electronic circuit block 220 as later explained. The circuit block 220 includes a crystal oscillator 222 for generating clock signals and a micro-computer IC 221 having the function of receiving sensor signals from water pressure sensor 202 and outputting the water depth information.

The water depth train wheels 230 are reduced in speed to 1/1200 by a water depth rotor 232, rotated by water depth motor 231 responsive to output signals from the electronic circuit block 220 and water depth counter wheels 233 to 235, for driving the centrally arranged water depth wheel 203. The maximum water depth train wheels 240 are reduced in speed to 1/600 by a maximum water depth rotor 242, rotated by maximum water depth motor 241 responsive to an output signal from the electronic circuit block 220, and maximum water depth counter wheels 243 to 245, for driving the centrally arranged maximum water depth wheel 204.

Referring to FIG. 22, the water depth counter wheel 235 and the maximum water depth counter wheel 245 are carried by bridges 205, 207, while a spacer 206 is sandwiched between the bridges 205 and 207. The water depth counter gear 236, constituting the water depth counter wheel 235, the bridge 205, the spacer 206 and the bridge 207 are provided with holes 236*a*, 205*a*, 206*a* and 207*a*, which are overlapped in a plan view. The maximum water depth counter gear 246 of the maximum water depth counter wheel 245, bridge 205, spacer 206 and the bridge 207 are provided with holes 246*b*, 205*b*, 206, and 207*b*, which are overlapped in a plan view.

Figure 23A:
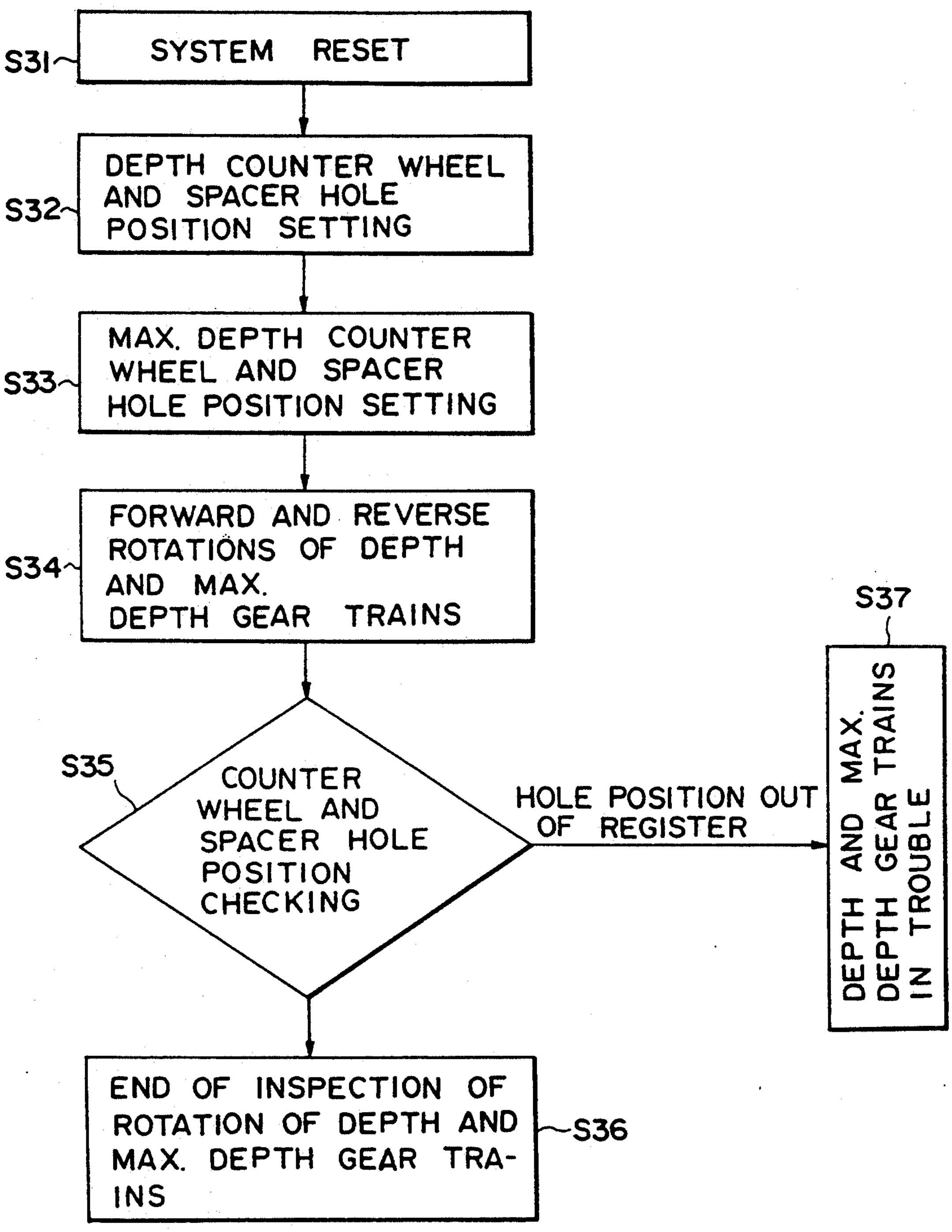
FIGS. 23A–23C are flow charts showing a sequence of inspection of the rotation of the train wheels of the electronic timepiece of the third embodiment.

Three methods for inspecting the water depth train wheels 230 and the maximum water depth train wheels 240 of the movement 201 will be hereinafter explained by referring to FIGS. 23A to 23C.

Inspection Method 1

The inspection method for the rotation of the water depth train wheels 230 and the maximum water depth train wheels 240 of the movement 201 in the forward and reverse directions will be explained by referring to FIG. 23A.

Figure 24A:
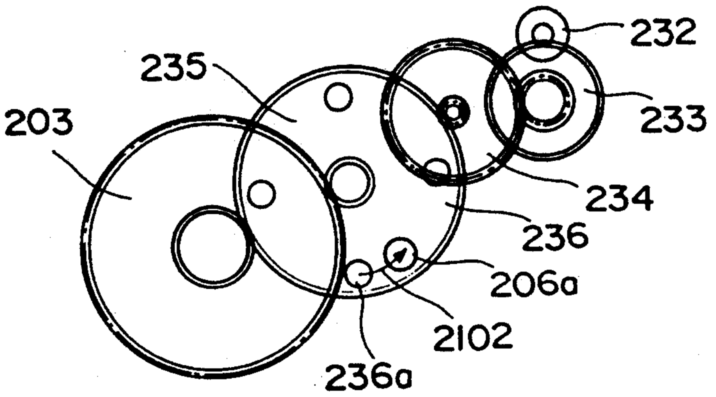
FIG. 24 A to D show the statuses of the train wheels of the electronic timepiece of the third embodiment.

After assembly of the movement, the crown 250 is pulled twice and the pushbuttons 251 to 253 are pressed and turned on simultaneously for resetting the system (step S31). Then, with the crown 250 pulled twice, the pushbuttons 251, 253 are pushed to produce operating signal outputs from an electronic circuit block 220 for registering the hole 236*a* of the water depth counter gear 236 with the hole 206*a* of the spacer 206 as shown by arrow 2102 shown in FIG. 24A for matching the hole positions (step S32).

When the pushbutton 251 is thrust once, an actuating signal is outputted one step. When the pushbutton 31 is thrust continuously (for longer than 1 second), the actuating signal is produced continuously for driving an operating signal continuously for driving the depth of water rotor 232 in a forward direction. By thrusting the pushbutton 251, with the pushbutton 253 previously thrust, the depth of water rotor 232 may be driven in the reverse direction.

Then, by an optional operating signal output from the electronic circuit block 220, by the operation of the pushbuttons 252, 253, the hole 246*b* of the maximum water depth counter gear 246 may be registered with the hole 206*b* of the spacer 206 for hole position matching (step S33).

If the pushbutton 252 is thrust once at this time, an operating signal is outputted in one step. If the pushbutton is thrust continuously (for longer than 1 sec) the operating signal is outputted continuously for driving the maximum water depth rotor 242 in the forward direction. If the pushbutton 252 is thrust after previously thrusting the pushbutton 253, the maximum water depth rotor 242 may be driven in the reverse direction.

Figure 24B:
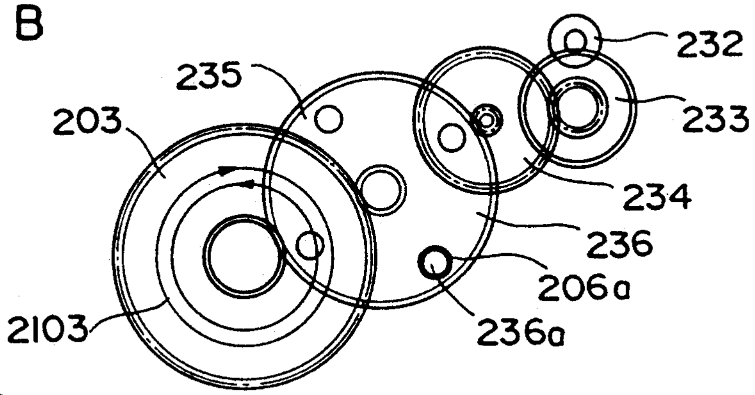

Then, the crown 250 is set to zero stage and the pushbutton 251 is turned on. In this manner, an operating signal for water depth train wheels rotation inspection is outputted from a pre-set electronic circuit block 220, so that the water depth rotor 232 and the maximum water depth rotor 242 are rotated in the forward and reverse directions by fast feed. The water depth wheel 203 is rotated once in the forward direction and once in the reverse direction. as shown by an arrow 2103 shown in FIG. 24B, at the same time that an operating signal for maximum water depth train wheels rotation inspection is issued, so that the maximum water depth wheel 204 is rotated once in the forward direction and once in the reverse direction (step S34).

After the end of driving of the water depth train wheels 230 and the maximum water depth train wheels 240, the state of register of the hole 236*a* of the water depth counter wheel 236 with the hole 206*a* of the spacer 206 and the state of register of the hole 246*b* of the maximum water depth counter wheel 246 with the hole 206*b* of the spacer 206 may be checked for inspecting the rotation of the water depth train wheels 230 and the maximum water depth train wheels 240 (step S35).

Figure 24C:
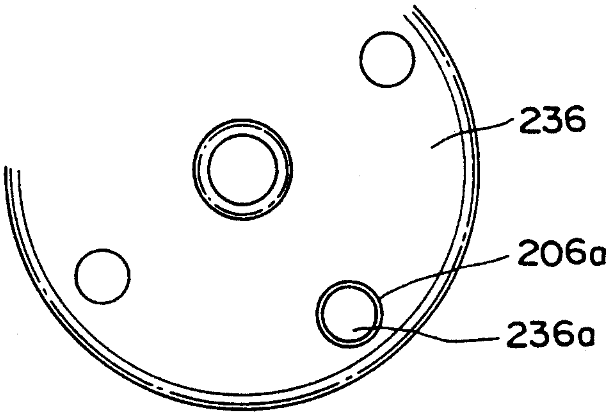
Figure 24D:
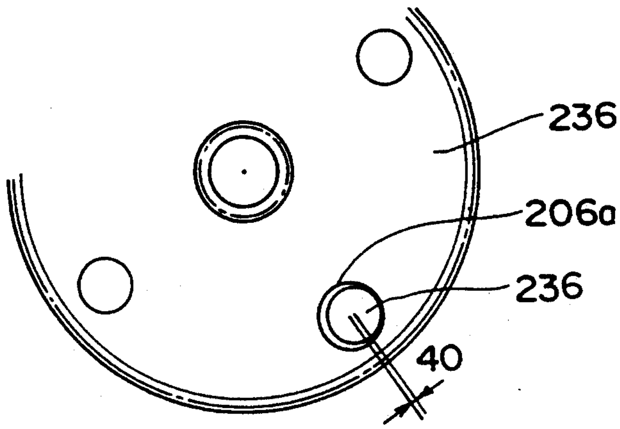

If the hole 236*a* of the water depth counter gear 236 is in register with the hole 6*a* of the spacer 6, as shown in FIG. 24C, the water depth train wheels 230 is in regular operation. If the hole 246*b* of the maximum water depth counter gear 246 is in register with the hole 206*b* of the spacer 206, the maximum water depth train wheels 240 is also in regular operation. This completes inspection of the rotation of the water depth train wheels 230 and the maximum water depth train wheels 240 in forward and reverse directions (step S36).

If the hole 236*a* of the water depth counter gear 236 is out of register with the hole 206*a* of spacer 206, or if the hole 246*b* of the maximum water depth counter gear 246 is out of register with the hole 206*b* of the spacer 206, the water depth train wheels 230 or the maximum water depth train wheels 240 is in incorrect operation. A hole offset of 40 μm is produced per 1 step operating signal for train wheels feed trouble, in which case the water depth train wheels 230 or the maximum water depth train wheels 240 are in rotational trouble so that the trouble may be located within the movement assembly process (step S37).

Inspection Method 2

Figure 23B:
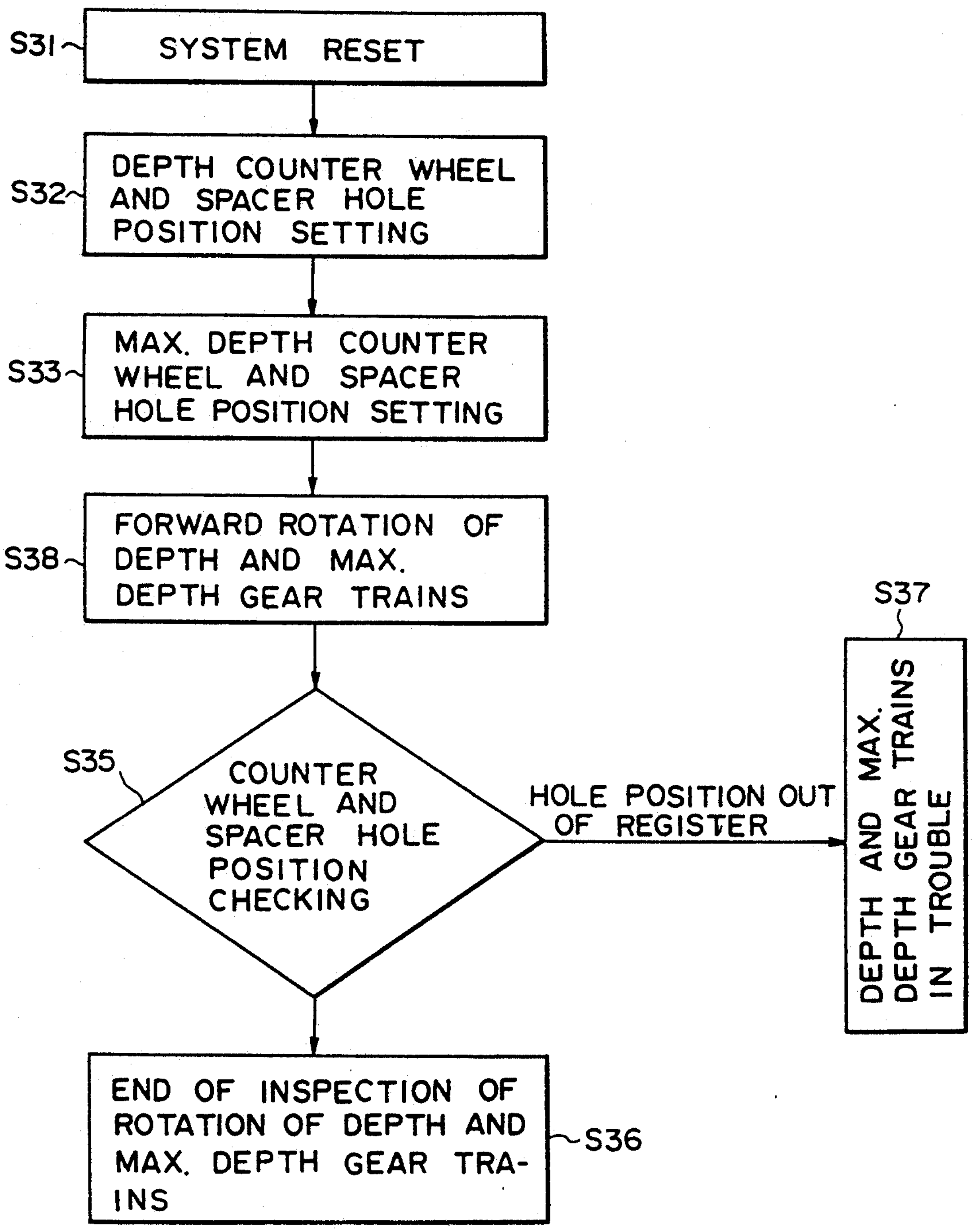

The inspection method of the forward train wheels rotation of the water depth train wheels 230 and the maximum water depth train wheels 240 of the movement 201 is explained by referring to FIG. 23B.

The steps S31 to S33 are carried out.

Then, with the crown 250 set to the zero stage, pushbutton 251 is turned ON and again turned ON so that an operating signal for the water depth train wheels rotation inspection from the electronic circuit block 220, which is per-set for rotating the water depth rotor 232 and the maximum water depth rotor 242 in the forward direction by fast feed, is issued for effecting one complete forward rotation of the water depth wheel 203, at the same time an operating signal for maximum water depth train wheels rotation inspection is also issued for effecting one complete forward rotation of the maximum water depth wheel 204 at step S38.

After the end of driving of the water depth train wheels 230 and the maximum water depth train wheels 240, the state of register of the hole 236*a* of the water depth counter gear 236 with the hole 206*a* of the spacer 206 and the state of register of the hole 246*a* of the maximum water depth counter gear 246 with the hole 206*b* of the spacer 206 may be checked for effectuating inspection of rotation of the water depth train wheels 230 and the maximum water depth train wheels 240.

If the hole 236*a* of the water depth counter gear 236 is in register with the hole 206*a* of the spacer 206, and if the hole 246*b* of the maximum water depth counter gear 246 is in register with the hole 206*b* of the spacer 206, the water depth train wheels and the maximum water depth train wheels are in normal operation. This completes inspection of the forward rotation of the maximum water depth train wheels 240 (step S36).

If the hole 236*a* of the water depth counter gear 236 is out of register with the hole 206*a* of the spacer 206, or if the hole 246*b* of the maximum water depth counter gear 246 is out of register with the hole 206*b* of the spacer 206, the water depth train wheels 230 or the maximum water depth train wheels 240 is in incorrect operation. In such case, the water depth train wheels 230 or the maximum water depth train wheels 240 are in incorrect rotation (step S37).

Inspection Method 3

Figure 23C:
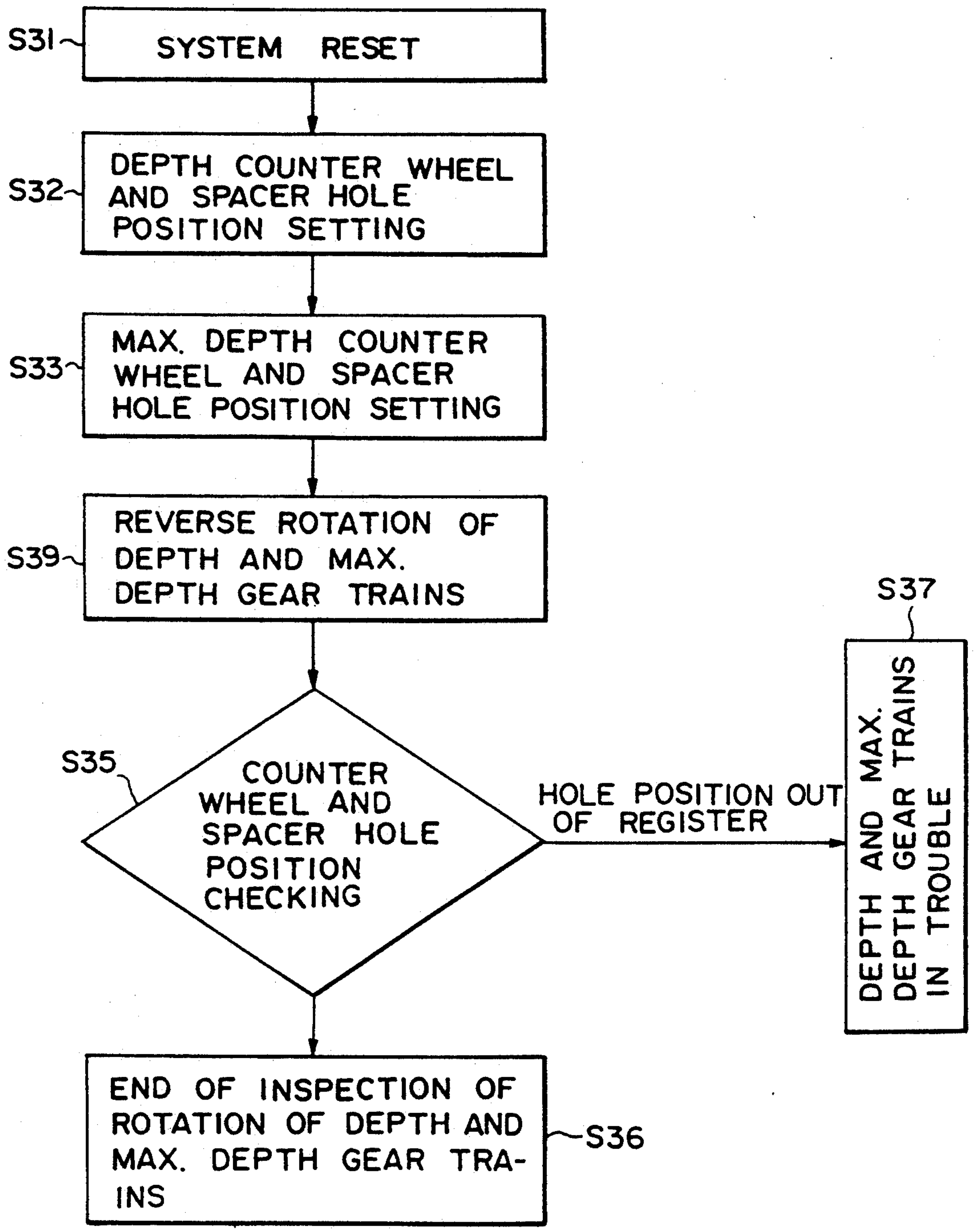

The inspection method for the reverse rotation of the water depth train wheels 230 and the maximum water depth train wheels 240 of the movement 201 is explained by referring to FIG. 23C.

The steps S31, S32 to S33 as described above are carried out.

With the crown 250 set to the stage zero, the pushbutton 252 is turned ON to output an operating signal for water depth train wheels rotation inspection (causing one reverse rotation of water depth wheel 230) from the electronic circuit block 220 which is pre-set to cause a fast feed reverse rotation of the maximum water depth rotor 242, at the same time an operating signal for maximum water depth train wheels rotation inspection (causing one reverse rotation of the maximum water depth wheel 204) at step S39 is outputted.

By checking the state of registry of the hole 236*a* of the water depth counter gear 236 with the hole 206*a* of the spacer 206 and the state of registry of the hole 246*b* of the maximum water depth counter gear 246 with the hole 206*b* of the spacer 206, following the end of driving of the train wheels 230, 240, inspection of the rotation of the train wheels 230, 240 can be realized at step S35.

If the hole 236*a* of the water depth counter gear 236 is in register with the hole 206*a* of the spacer 206, and if the hole 246*b* of the maximum water depth counter gear 246 is in register with the hole 206*b* of the spacer 206, the train wheels 230 and 240 are in correct operation. This terminates the inspection of the reverse rotation of the train wheels 230 and 240 (step S36).

If the hole 236*a* of the water depth counter gear 236 is out of register with the hole 206*a* of the spacer 206 or if the hole 246*b* of the maximum water depth counter gear 246 is out of register with the hole 206*b* of the spacer 206, the train wheels 230 or the train wheels 240 is in incorrect operation. In this case, the water depth train wheels 230 or the maximum water depth train wheels 240 is in incorrect rotation (step S37).

With the electronic wrist watch provided with the functional hands according to the present third embodiment, by providing the counter gear and the bridge with registering holes, inspection of the train wheels rotation may be made satisfactorily by the movement per se.

In this manner, inspection of the train wheels rotation, which can be performed in the prior art only in the exterior part assembly process step, may now be performed during assembling of the timepiece movement.

What is claimed is:

1. An electronic timepiece with time indicating hands and functional hands other than time, comprising:

a timepiece base plate, a motor and associated train wheels thereof situated in a middle portion of the base plate for actuating the time indicating hands, a winding stem for operating the timepiece, an indicating hand correction mechanism having a clutch wheel associated with the winding stem so that when the winding stem is operated, the time indicating hands are adjusted, a patterned circuit board with an IC chip and a crystal oscillator situated on the base plate with a space therebetween, a battery block situated behind the circuit board for driving the motor and the circuit board, detection means for detecting information other than time, function display means formed of first and second functional hands, said first and second functional hands having first and second functional wheels, respectively, said function display means receiving information from the detection means and displaying the information by the first and second functional hands, first functional train wheel engaging the first functional wheel of the first functional hand, and second functional train wheels engaging the second functional wheel of the second functional hand, said first and second functional train wheels being formed independently from each other and arranged between the base plate and the circuit board and on the base plate at a side of a dial, and a first motor for the first functional hand and a second motor for the second functional hand, said first and second motors being formed independently from each other and from the motor for the time indicating hands, said first and second motors and the motor for the time indicating hands being interposed between the base plate and the circuit board.

2. An electronic timepiece as claimed in claim 1, wherein said time indicating hands, and said first and second functional hands are coaxially arranged in the timepiece.

3. An electronic timepiece as claimed in claim 1, wherein said first and second functional hands have shafts coaxially arranged in the timepiece, distances between shafts for the first functional train wheels being arranged as in distances between shafts for the second functional train wheels.

4. An electronic timepiece as claimed in claim 1, wherein said battery block has a flat shape, and is laminated behind the circuit board.

5. An electronic timepiece as claimed in claim 1, wherein said detection means detects water pressure, said first functional hand indicating current diving water depth and said second functional hand indicating maximum water depth to be reached.

6. An electronic timepiece as claimed in claim 5, further comprising a sub-hand for indicating smallest graduations for depth.

7. An electronic timepiece as claimed in claim 1, further comprising a coil and an IC chip for the motor of the time indicating hands, said coil and IC chip being disposed on the circuit board and arranged on a line extending from the winding stem.

8. An electronic timepiece as claimed in claim 1, wherein said function display means indicates water depth and includes a water pressure sensor, said water pressure sensor having a semiconductor sensor chip with a diaphragm for outputting an electrical sensor signal responsive to water pressure fluctuations, a two-stage hole for setting a lead terminal presenting an electrode surface for wire-bonding of the sensor chip, and a profiled groove for sealing the lead terminal.

9. An electronic timepiece as claimed in claim 1, further comprising a train wheel support for supporting the train wheels for the time indicating hands, said train wheel support being situated on a horizontal level as in the circuit board.

10. An electronic timepiece as claimed in claim 1, wherein a speed reduction ratio from a rotor of the first functional train wheels driven by the first motor to the first functional wheel with the first functional hand is set to 1/1600 to 1/900, and a speed reduction ratio from a rotor of the second functional train wheels driven by the second motor to the second functional wheel with the second functional hand is set to 1/900 to 1/400.

11. An electronic timepiece as claimed in claim 1, wherein at least one of said first and second functional train wheels includes a counter wheel having a mark and capable of forward and reverse rotations responsive to an operating signal from an electric circuit block, said electronic timepiece further including a stationary plate with a mark for carrying the counter wheel, means for rotating said counter wheel for a predetermined amount, and means for checking the marks after rotation so that rotation of the train wheel is checked by the marks formed on the counter wheel and the stationary plate.

12. An electronic timepiece as claimed in claim 11, wherein said counter wheel is a driving counter wheel, and said mark in the stationary plate is a hole through which the mark on the counter wheel is seen.

* * * * *